US010291171B2

(12) United States Patent
Moritake et al.

(10) Patent No.: US 10,291,171 B2
(45) Date of Patent: May 14, 2019

(54) MOTOR CONTROL APPARATUS

(71) Applicant: Mitsubishi Electric Corporation, Tokyo (JP)

(72) Inventors: Naoki Moritake, Tokyo (JP); Tomohiro Kimura, Tokyo (JP); Kazunari Masudome, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/870,100

(22) Filed: Jan. 12, 2018

(65) Prior Publication Data

US 2018/0337624 A1  Nov. 22, 2018

(30) Foreign Application Priority Data

May 22, 2017 (JP) ................................ 2017-100577

(51) Int. Cl.
*H02P 29/024* (2016.01)
*B60L 11/18* (2006.01)
*H02H 7/08* (2006.01)

(52) U.S. Cl.
CPC ................................ *H02P 29/0241* (2016.02)

(58) Field of Classification Search
CPC .. H02P 29/0241; B60L 11/18; B60L 2210/30; H02M 17/48; H02H 7/122
See application file for complete search history.

(56) References Cited

U.S. PATENT DOCUMENTS

| 5,880,947 A * | 3/1999 | Imanaka | H02M 1/4233 |
| | | | 363/127 |
| 2007/0086226 A1* | 4/2007 | Mavier | H02M 7/53875 |
| | | | 363/132 |
| 2008/0211450 A1* | 9/2008 | Yamada | H02P 23/0027 |
| | | | 318/801 |

(Continued)

FOREIGN PATENT DOCUMENTS

| JP | 2012-005229 A | 1/2012 |
| JP | 5547559 B2 | 7/2014 |

(Continued)

*Primary Examiner* — Eduardo Colon Santana
*Assistant Examiner* — Said Bouziane
(74) *Attorney, Agent, or Firm* — Sughrue Mion, PLLC; Richard C. Turner

(57) ABSTRACT

An upper switching device and a lower switching device in an electric-power conversion unit are separately driven to close by an upper closing command signal and a lower closing command signal, respectively, generated by a calculation control unit; in response to occurrence of an excessive current abnormality or an excessive voltage abnormality, upper and lower selection circuits and a penetration prevention circuit provided in a signal path select an upper three-phase short-circuiting command signal or a lower three-phase short-circuiting command signal, or an upper-and-lower six-phase cutoff command signal, and a penetration prevention time prohibits upper and lower switching devices from being concurrently closed; when an excessive voltage abnormality occurs, the three-phase short-circuiting command signal is immediately generated, without an advanced cutoff operation being performed. As a result, excessive-voltage breakage of the circuit components is prevented.

20 Claims, 10 Drawing Sheets

(56) References Cited

U.S. PATENT DOCUMENTS

| | | | |
|---|---|---|---|
| 2011/0310644 A1* | 12/2011 | Ogura | H02M 1/32 |
| | | | 363/55 |
| 2012/0146567 A1* | 6/2012 | Iwaji | H02P 9/02 |
| | | | 318/504 |
| 2012/0201064 A1* | 8/2012 | Asakura | H02M 7/53871 |
| | | | 363/98 |
| 2012/0313564 A1* | 12/2012 | Guitard | H02M 7/48 |
| | | | 318/400.21 |
| 2013/0127383 A1 | 5/2013 | Kawamura | |
| 2015/0280624 A1 | 10/2015 | Sotome | |

FOREIGN PATENT DOCUMENTS

| | | | |
|---|---|---|---|
| JP | 5813167 | B2 | 11/2015 |
| JP | 5857394 | B2 | 2/2016 |

\* cited by examiner

FIG. 3A

| US | DS | UD0 | U0 | D0 | A | B | U0×A | D0×B |
|---|---|---|---|---|---|---|---|---|
| L | L | L | H | H | Ux0 | Dx0 | Ux0 | Dx0 |
| H | L | L | H | L | H | Dx0 | H | L |
| L | H | L | L | H | Ux0 | H | L | H |
| *H | *H | L | L | L | *H | *H | L | L |
| L | L | H | L | L | Ux0 | Dx0 | L | L |
| H | L | H | H | L | H | Dx0 | H | L |
| L | H | H | L | H | Ux0 | H | L | H |
| *H | *H | H | L | L | *H | *H | L | L |

FIG. 3B

| U0×A | D0×B | Ux1 | | Dx1 | |
|---|---|---|---|---|---|
| | | U00=H | U00=L | D00=H | D00=L |
| Ux0 | Dx0 | L | Ux0 | L | Dx0 |
| H | L | L | L | L | L |
| L | H | L | L | L | H |
| L | L | L | L | L | L |
| L | L | L | L | L | L |
| H | L | L | H | L | L |
| L | H | L | L | L | H |
| L | L | L | L | L | L |

FIG. 3C

| Ux1 | Dx1 | Ux2 | Dx2 | UPPER DEVICE | LOWER DEVICE | REMARKS |
|---|---|---|---|---|---|---|
| | | C | D | | | |
| H | L | L | H | CLOSED | OPENED | UPPER DELAYED CLOSING |
| L | H | H | L | OPENED | CLOSED | LOWER DELAYED CLOSING |
| L | L | H | H | OPENED | OPENED | PENETRATION BEING PREVENTED |
| H | H | H | H | OPENED | OPENED | COMBINATION IS INADEQUATE |

FIG. 7A

| OUTE | UOO | DOO | E | F | G | M |
|---|---|---|---|---|---|---|
| H | L | L | L | L | Ux2 | Dx2 |
| H | L | H | L | L | Ux2 | Dx2 |
| H | H | L | L | L | Ux2 | Dx2 |
| H | H | H | L | L | Ux2 | Dx2 |
| L | L | L | L | H | Ux2 | H |
| L | L | H | H | L | H | Dx2 |
| L | H | L | L | H | Ux2 | H |
| L | H | H | L | L | Ux2 | Dx2 |

FIG. 7B

| Ux2 | Dx2 | Ux3 | Dx3 | | | |
|---|---|---|---|---|---|---|
| G | M | J | K | UPPER DEVICE | LOWER DEVICE | REMARKS |
| H | L | L | H | CLOSED | OPENED | UPPER DELAYED CLOSING |
| L | H | H | L | OPENED | CLOSED | LOWER DELAYED CLOSING |
| L | L | H | H | OPENED | OPENED | PENETRATION BEING PREVENTED |
| H | H | H | H | OPENED | OPENED | COMBINATION IS INADEQUATE |

MOTOR CONTROL APPARATUS

BACKGROUND OF THE INVENTION

Field of the Invention

The present invention relates to a motor control apparatus for a three-phase AC motor that collaborates with a vehicle engine for making a vehicle travel and particularly to improvement of a motor control apparatus in which in order to prevent an electric shock, a low-voltage-system vehicle battery is utilized.

Description of the Related Art

In a hybrid vehicle utilizing an internal combustion engine and an electric motor, a calculation control unit, which performs driving control of a three-phase AC motor that is supplied with electric power by a vehicle battery by way of an electric-power conversion unit in which a three-phase full wave bridge circuit is formed by use of transistors, implements power-running drive control of the motor, when a motor rotation speed instructed by a higher-rank microprocessor and a driving current corresponding to load torque shared with the engine are set; concurrently, the calculation control unit controls regenerative charging of the vehicle battery and performs idling control (rotation-synchronous operation in which power-running torque is set to zero) for stopping the regenerative charging when the charging voltage of the vehicle battery is appropriate.

When there occurs an abnormality in the calculation control unit or an excessive current abnormality and/or an excessive voltage abnormality caused by occurrence of disconnection or a short-circuit abnormality in the transistors provided in the electric-power conversion unit, there is performed control in which all of the transistors are cut off by upper-and-lower six-phase cutoff command signals or in which three-phase short-circuiting command signals for upper-arm or lower-arm transistors in the three-phase full wave bridge circuit are generated so that the power-generation voltage of the motor is suppressed.

For example, according to FIG. 2 in Patent Document 1, the first protection circuit 201, which functions as a six-phase cutoff circuit for the prestage upper arms and lower arms, the second protection circuits 202a and 202b, which function as the respective three-phase shorting circuits for the middle-stage upper arms and lower arms, and the third protection circuit 203, which functions as a six-phase cutoff circuit for the post-stage upper arms and lower arms, are provided between the gate driving unit 109 for the switching devices in the inverter 103 and the signal generation unit 206.

When the excessive-current detection signal OC is generated, the first protection circuit 201 operates; when the excessive-voltage detection signal OV is generated, the first protection circuit 201 temporarily performs six-phase cutoff, and then the second protection circuit 202b (or 202a) for the lower arm side (or the upper arm side) of the three-phase full wave bridge circuit operates; as a result, three-phase short-circuiting at the lower arm side (or the upper arm side) is performed. When the inverter abnormality detection unit 108 generates an abnormality detection signal, the third protection circuit 203 operates, and hence the three-phase short-circuiting by the second protection circuits 202a and 202b becomes ineffective.

Accordingly, because when the three-phase short-circuiting of the upper arm side or the lower arm side of the three-phase full wave bridge circuit is performed, the first protection circuit 201 preliminarily performs all-phase cutoff, a short-circuit abnormality is prevented from occurring in the upper arms and lower arms of six phases and hence, as a fail-safe means for an inverter abnormality, the first priority is given to the third protection circuit 203.

PRIOR ART REFERENCE

Patent Document

[Patent Document 1] Japanese Patent Application Laid-Open No. 2012-005229

In the "electric power converter" in foregoing Patent Document 1, three-stage preferential protection circuits 201 through 203 are utilized; the selection command signals therefore are generated by the timer circuit 205, the three-phase short-circuiting control logic 204, and the inverter abnormality detection unit 108, which are hardware members provided outside the PWM signal generation unit 206.

Accordingly, the whole circuit configuration becomes complicated and expensive, and when a disconnection abnormality or a short-circuit abnormality occurs in part of the switching devices, it is difficult to select three-phase short-circuiting control, of the upper arm side or the lower arm side of the three-phase full wave bridge circuit, that is suitable to the foregoing abnormality; in this case, the third protection circuit 203 cuts off all of the devices and hence it is required that as measures for an excessive voltage abnormality caused by performing upper-arm and lower-arm six-phase cutoff, the respective withstanding voltages of circuit components such as the switching device and the power-source capacitor are preliminarily raised.

The present invention is to provide a motor control apparatus provided with an electric-power conversion unit that supplies AC electric power to a three-phase AC motor from a vehicle battery of, for example, DC 48[V] system, the power-source voltage of which is lowered in order to reduce electric-shock damage, and particularly to provide a motor control apparatus having a simple circuit configuration that gives priority to excessive-voltage protection and makes it possible to utilize large-current and low-withstanding-voltage circuit components.

SUMMARY OF THE INVENTION

A motor control apparatus according to the present invention is to control a three-phase AC motor including permanent-magnet rotating magnetic poles integrally coupled with a vehicle engine mounted in a vehicle and a three-phase armature winding for generating a rotating magnetic field; the motor control apparatus includes an electric-power converter that is supplied with electric power by a vehicle battery mounted in the vehicle, by way of an electric power switching device, and that performs electric-power conversion between the vehicle battery and the three-phase AC motor, a calculation controller that controls the electric-power converter, and an abnormality monitor that monitors whether or not there exists an abnormality in the motor control apparatus; the motor control apparatus is characterized in that the electric-power converter has a three-phase bridge circuit formed of an upstream switching device and a downstream switching device provided for each of three phases and a power-source capacitor connected in parallel with the three-phase bridge circuit, in that the calculation controller is provided with a microprocessor that creates control signals for performing switching control of the upstream switching devices and the downstream switching devices so as to implement driving control of the three-phase AC motor and charge control of the vehicle battery and with a nonvolatile program memory that collaborates with the microprocessor, in that the abnormality monitor includes an excessive voltage detector that detects an excessive voltage abnormality against the voltage of the power-source capacitor or the vehicle battery, a device abnormality detector that detects a device abnormality in each of the upstream switching devices and the downstream switching devices, and an excessive current detector that detects an excessive current abnormality in electric currents flowing in the armature windings of at least two phases among the three phases and at least one of respective electric currents flowing in the upstream switching device and the downstream switching device, in that the microprocessor generates a pulse-width modulation signal for the upstream switching device provided for each of the phases and an inversed pulse-width modulation signal, which is the inversed logic signal of the pulse-width modulation signal, for the downstream switching device provided for each of the phases, and includes an upper-side penetration preventer and a lower-side penetration preventer, in that the upper-side penetration preventer generates an upper closing command signal in a predetermined delay time after the pulse-width modulation signal is generated, in that the lower-side penetration preventer generates an lower closing command signal in a predetermined delay time after the inversed pulse-width modulation signal is generated, in that based on the upper closing command signal supplied by way of an upper selection circuit and a penetration prevention circuit, the upstream switching device is driven to close, in that based on the lower closing command signal supplied by way of a lower selection circuit and the penetration prevention circuit, the downstream switching device is driven to close, in that the upper-side penetration preventer and the lower-side penetration preventer are software that prohibit the upper closing command signal and the lower closing command signal from being generated concurrently, in that the penetration prevention circuit has an upper penetration prevention timer and a lower penetration prevention timer that function as hardware for prohibiting the upper closing command signal and the lower closing command signal from being generated concurrently, in that in response to an excessive-current abnormality detection signal from the excessive current detector, the microprocessor generates any one of an upper-and-lower six-phase cutoff command signal for cutting off all of the upstream switching devices and the downstream switching devices, an upper three-phase cutoff first command signal for cutting off only the upstream switching devices, and a lower three-phase cutoff first command signal for cutting off only the downstream switching devices, or in response to an excessive voltage abnormality detection signal from the excessive voltage detector, the microprocessor generates any one of an upper three-phase short-circuiting command signal for short-circuiting only the upstream switching devices and a lower three-phase short-circuiting command signal for short-circuiting only the downstream switching devices, in that when instead of the upper closing command signal, the upper three-phase short-circuiting command signal is inputted thereto, the upper selection circuit closes at once all of the upstream switching devices provided for the respective phases, through the intermediary of the penetration prevention circuit, and when instead of the upper closing command signal, the upper three-phase cutoff first command signal is inputted thereto, the upper selection circuit opens at once all of the upstream switching devices provided for the respective phases, through the intermediary of the penetration prevention circuit, and in that when instead of the lower closing command signal, the lower three-phase short-circuiting command signal is inputted thereto, the lower selection circuit closes at once all of the downstream switching devices provided for the respective phases, through the intermediary of the penetration prevention circuit, and when instead of the lower closing command signal, the lower three-phase cutoff first command signal is inputted thereto, the lower selection circuit opens at once all of the upstream switching devices provided for the respective phases, through the intermediary of the penetration prevention circuit.

Advantage of the Invention

As described above, a motor control apparatus according to the present invention includes an electric-power converter that is supplied with electric power by a vehicle battery mounted in a vehicle, by way of an electric power switching device, and that performs electric-power conversion between the vehicle battery and the three-phase AC motor, a calculation controller that controls the electric-power converter, and an abnormality monitor that monitors whether or not there exists an abnormality in the motor control apparatus; the electric-power converter has a three-phase bridge circuit formed of an upstream switching device and a downstream switching device provided for each of three phases and a power-source capacitor connected in parallel with the three-phase bridge circuit; the calculation controller is provided with a microprocessor that creates control signals for performing switching control of the upstream switching devices and the downstream switching devices so as to implement driving control of the three-phase AC motor and charge control of the vehicle battery and with a nonvolatile program memory that collaborates with the microprocessor; the abnormality monitor includes an excessive voltage detector that detects an excessive voltage abnormality against the voltage of the power-source capacitor or the vehicle battery, a device abnormality detector that detects a device abnormality in each of the upstream switching devices and the downstream switching devices, and an excessive current detector that detects an excessive current abnormality in electric currents flowing in the armature windings of at least two phases among the three phases and at least one of respective electric currents flowing in the upstream switching device and the downstream switching device; the microprocessor generates a pulse-width modulation signal for the upstream switching device provided for each of the phases and an inversed pulse-width modulation signal, which is the inversed logic signal of the pulse-width modulation signal, for the downstream switching device provided for each of the phases, and includes an upper-side penetration preventer and a lower-side penetration preventer; the upper-side penetration preventer generates an upper closing command signal in a predetermined delay time after the pulse-width modulation signal is generated; the lower-side penetration preventer generates an lower closing command signal in a predetermined delay time after the inversed pulse-width modulation signal is generated; based on the upper closing command signal supplied by way of an upper selection circuit and a penetration prevention circuit, the upstream switching device is driven to close; based on the lower closing command signal supplied by way of a lower selection circuit and the penetration prevention circuit, the downstream switching device is driven to close; the upper-side penetration preventer and the lower-side penetration preventer are software that prohibit the upper closing command signal and the lower closing command signal from being generated concurrently; the penetration prevention circuit has an upper penetration prevention timer and a lower penetration prevention timer that function as hardware for prohibiting the upper closing command signal and the lower closing command signal from being generated concurrently; in response to an excessive-current abnormality detection signal from the excessive current detector, the microprocessor generates any one of an upper-and-lower six-phase cutoff command signal for cutting off all of the upstream switching devices and the downstream switching devices, an upper three-phase cutoff first command signal for cutting off only the upstream switching devices, and a lower three-phase cutoff first command signal for cutting off only the downstream switching devices, or in response to an excessive voltage abnormality detection signal from the excessive voltage detector, the microprocessor generates any one of an upper three-phase short-circuiting command signal for short-circuiting only the upstream switching devices and a lower three-phase short-circuiting command signal for short-circuiting only the downstream switching devices; when instead of the upper closing command signal, the upper three-phase short-circuiting command signal is inputted thereto, the upper selection circuit closes at once all of the upstream switching devices provided for the respective phases, through the intermediary of the penetration prevention circuit, and when instead of the upper closing command signal, the upper three-phase cutoff first command signal is inputted thereto, the upper selection circuit opens at once all of the upstream switching devices provided for the respective phases, through the intermediary of the penetration prevention circuit; when instead of the lower closing command signal, the lower three-phase short-circuiting command signal is inputted thereto, the lower selection circuit closes at once all of the downstream switching devices provided for the respective phases, through the intermediary of the penetration prevention circuit, and when instead of the lower closing command signal, the lower three-phase cutoff first command signal is inputted thereto, the lower selection circuit opens at once all of the upstream switching devices provided for the respective phases, through the intermediary of the penetration prevention circuit.

Thus, because during normal driving, a software means configured with the microprocessor and a hardware means configured with the upper and lower penetration prevention timers in the penetration prevention circuit provided at the post stage of the selection circuit collaborate with each other in order to perform penetration prevention for the upper closing command signal and the lower closing command signal generated by the microprocessor, there is demonstrated an effect that a temporary upper-and-lower short-circuit abnormality is prevented from occurring due to erroneous operation caused by noise.

Moreover, it is made possible that in the normal driving state, switching to the upper three-phase or lower three-phase short-circuiting command signal can directly be performed, and in this case, because the penetration prevention circuit prevents the occurrence of the upper-and-lower short-circuit abnormality, it is not required to temporarily generate the upper-and-lower six-phase cutoff command signal before the three-phase short-circuiting command signal is generated; therefore, there is demonstrated an effect that the control procedure is simplified and hence the control load on the microprocessor can be reduced and that excessive-voltage breakage of the circuit components in the electric-power converter can be prevented by making the three-phase short-circuiting command signal function prior to the upper-and-lower six-phase cutoff command signal.

The foregoing and other object, features, aspects, and advantages of the present invention will become more apparent from the following detailed description of the present invention when taken in conjunction with the accompanying drawings.

BRIEF DESCRIPTION OF THE DRAWINGS

A set of FIGS. 1A and 1B is a block diagram representing the overall circuit of a motor control apparatus according to Embodiment 1 of the present invention;

FIG. 3A is an explanatory table representing the logic states of control signals generated by selection circuits in the motor control apparatus according to Embodiment 1 of the present invention;

FIG. 3B is an explanatory table representing the logic list of input signals for upper-arm and lower-arm selection circuits in the motor control apparatus according to Embodiment 1 of the present invention;

FIG. 3C is an explanatory table representing the logic list of input and output signals of a penetration prevention circuit in the motor control apparatus according to Embodiment 1 of the present invention;

Figure 5A:
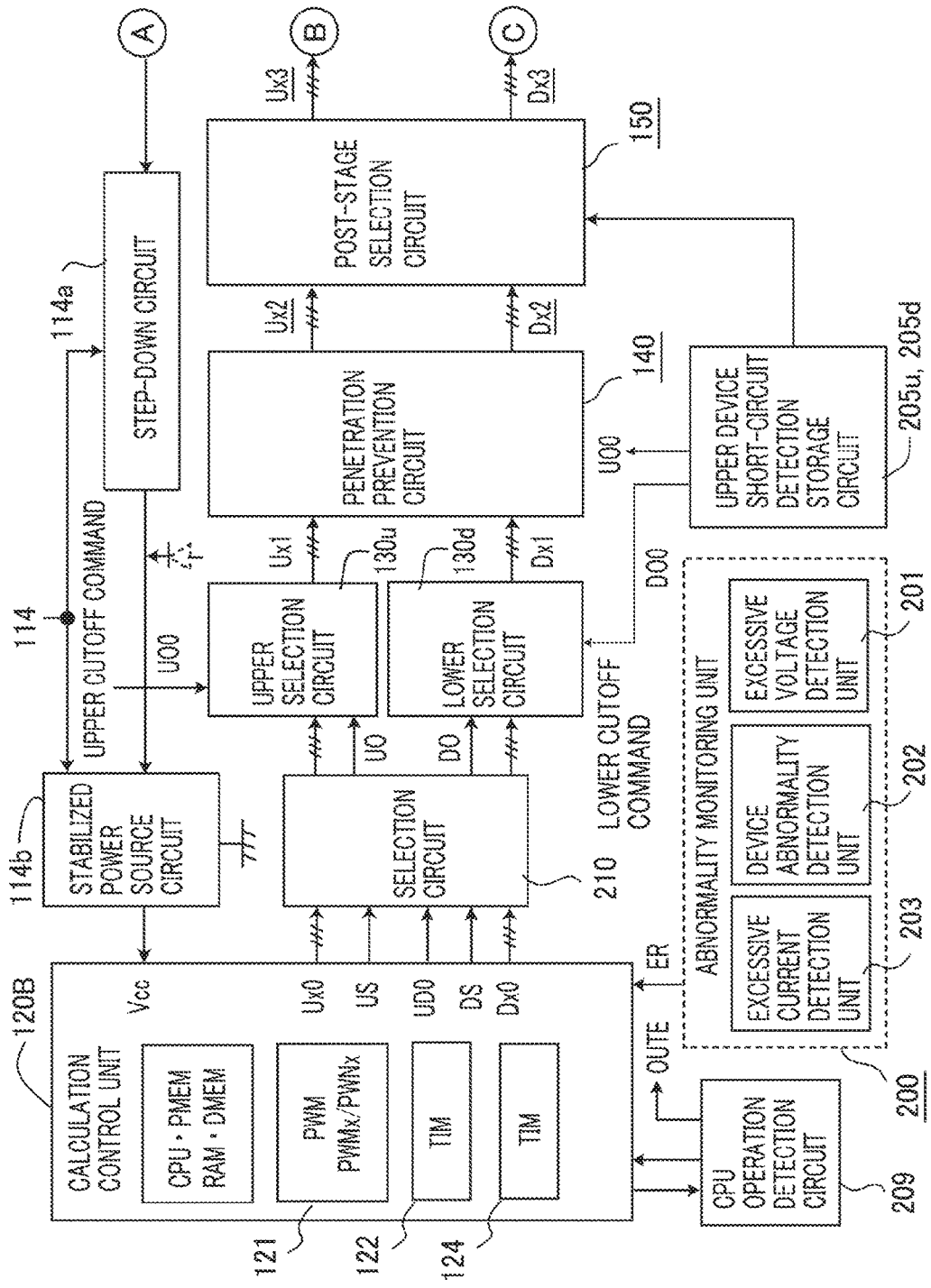
Figure 5B:
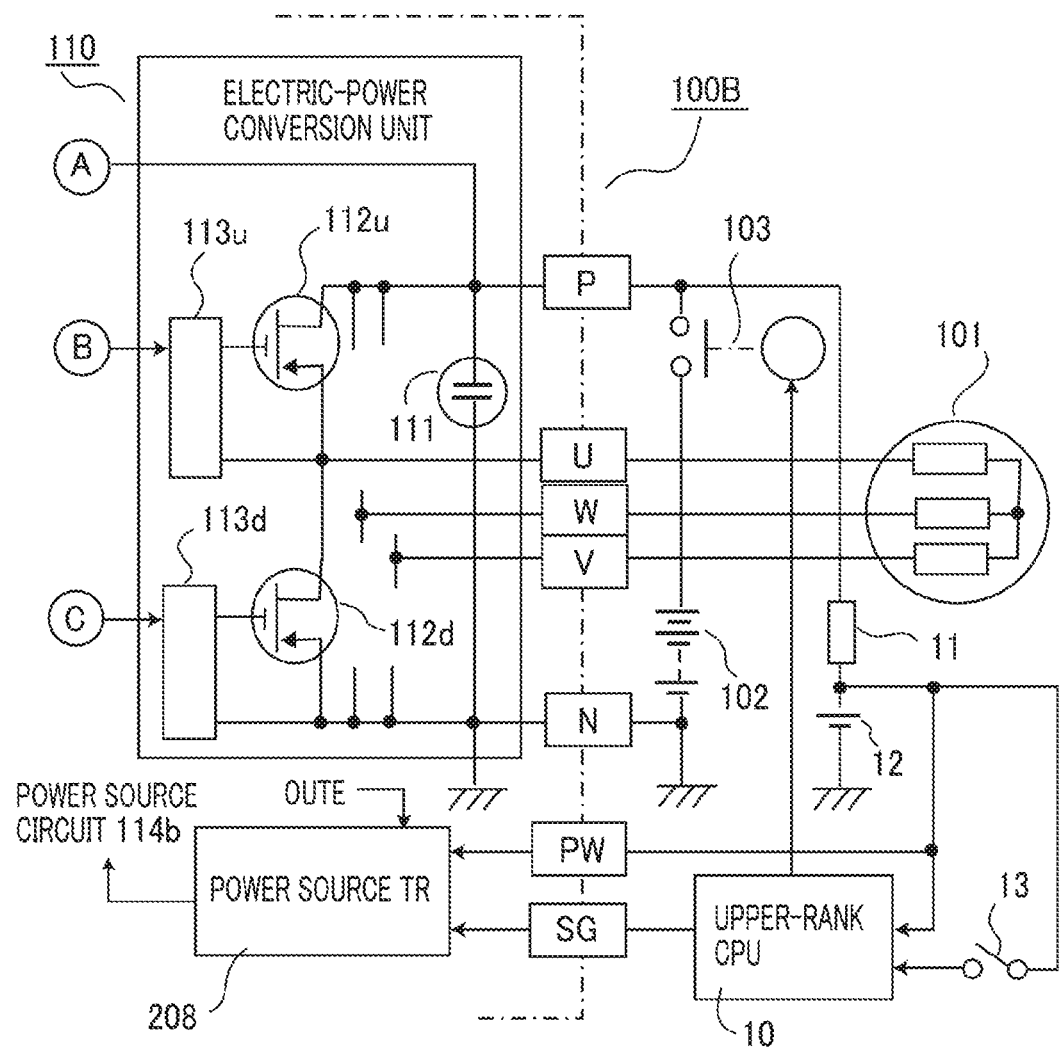
Figure 6:
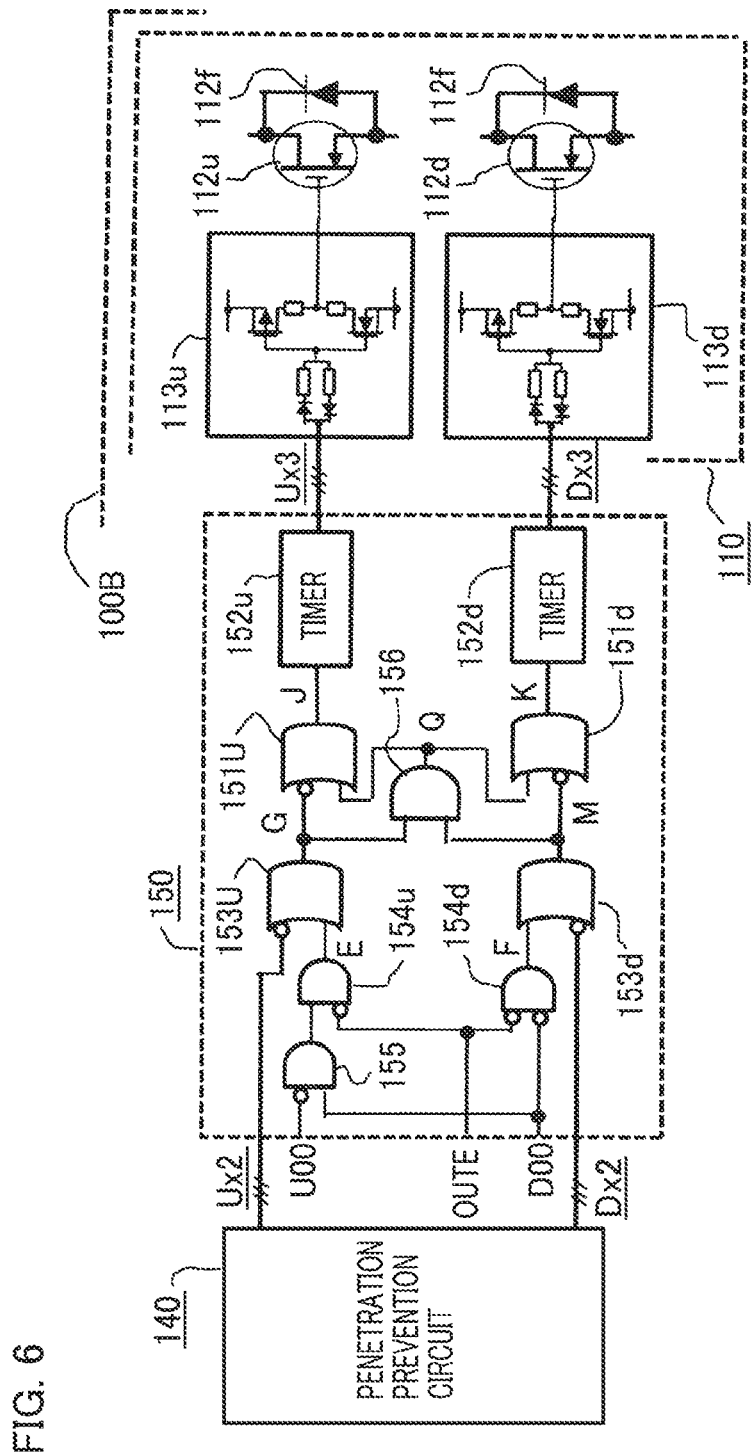

A set of FIGS. 5A and 5B is a block diagram representing the overall circuit of a motor control apparatus according to Embodiment 2 of the present invention;

FIG. 6 is a detailed block diagram representing part of the motor control apparatus according to Embodiment 2 of the present invention;

FIG. 7A is an explanatory table representing the logic list of former-half input and output signals of a post-stage selection circuit in the motor control apparatus according to Embodiment 2 of the present invention; and FIG. 7B is an explanatory table representing the logic list of latter-half input and output signals of the post-stage selection circuit in the motor control apparatus according to Embodiment 2 of the present invention.

DETAILED DESCRIPTION OF THE PREFERRED EMBODIMENTS

Embodiment 1

(1) Detailed Description of Configuration

Figure 1A:
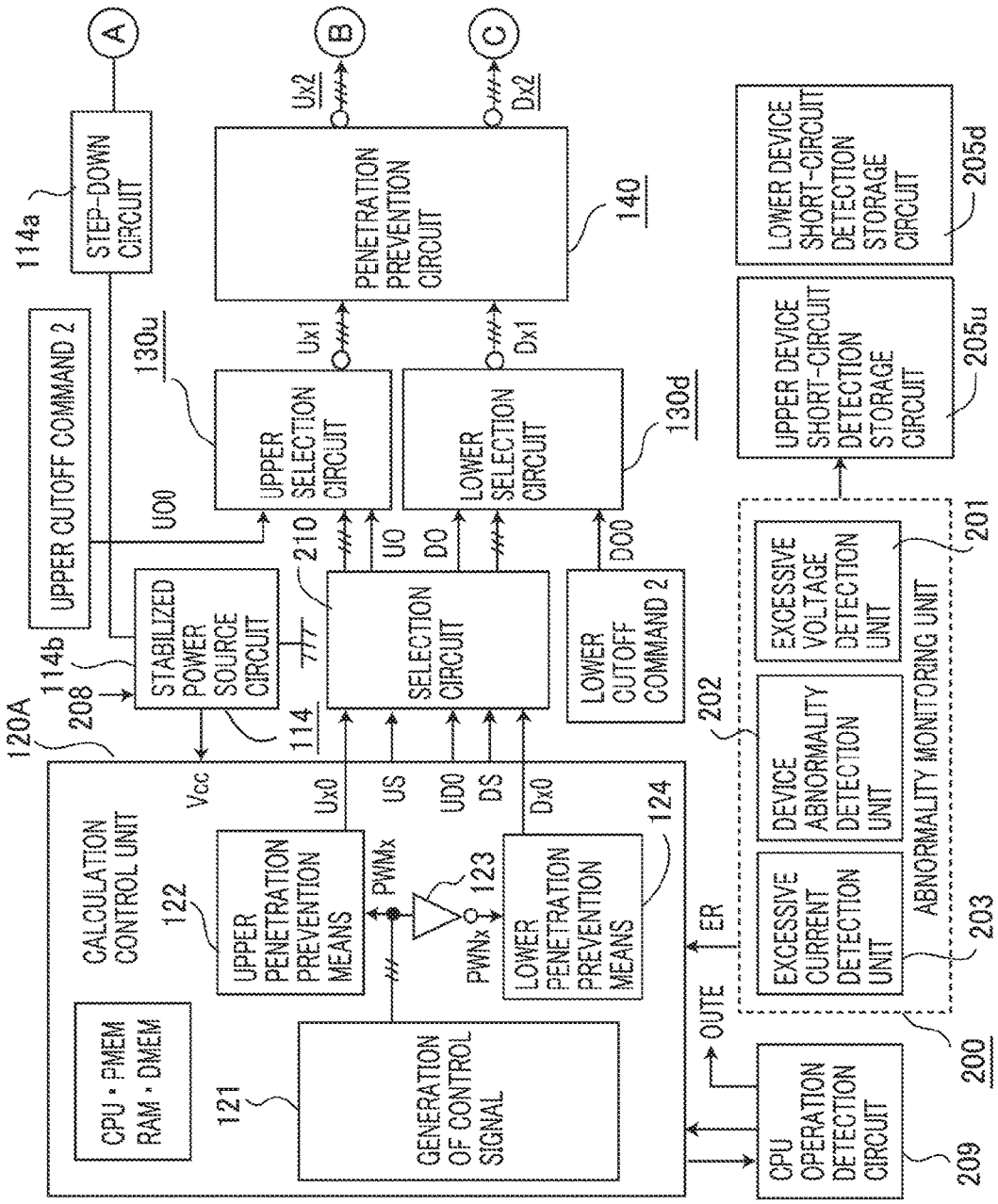
Figure 1B:
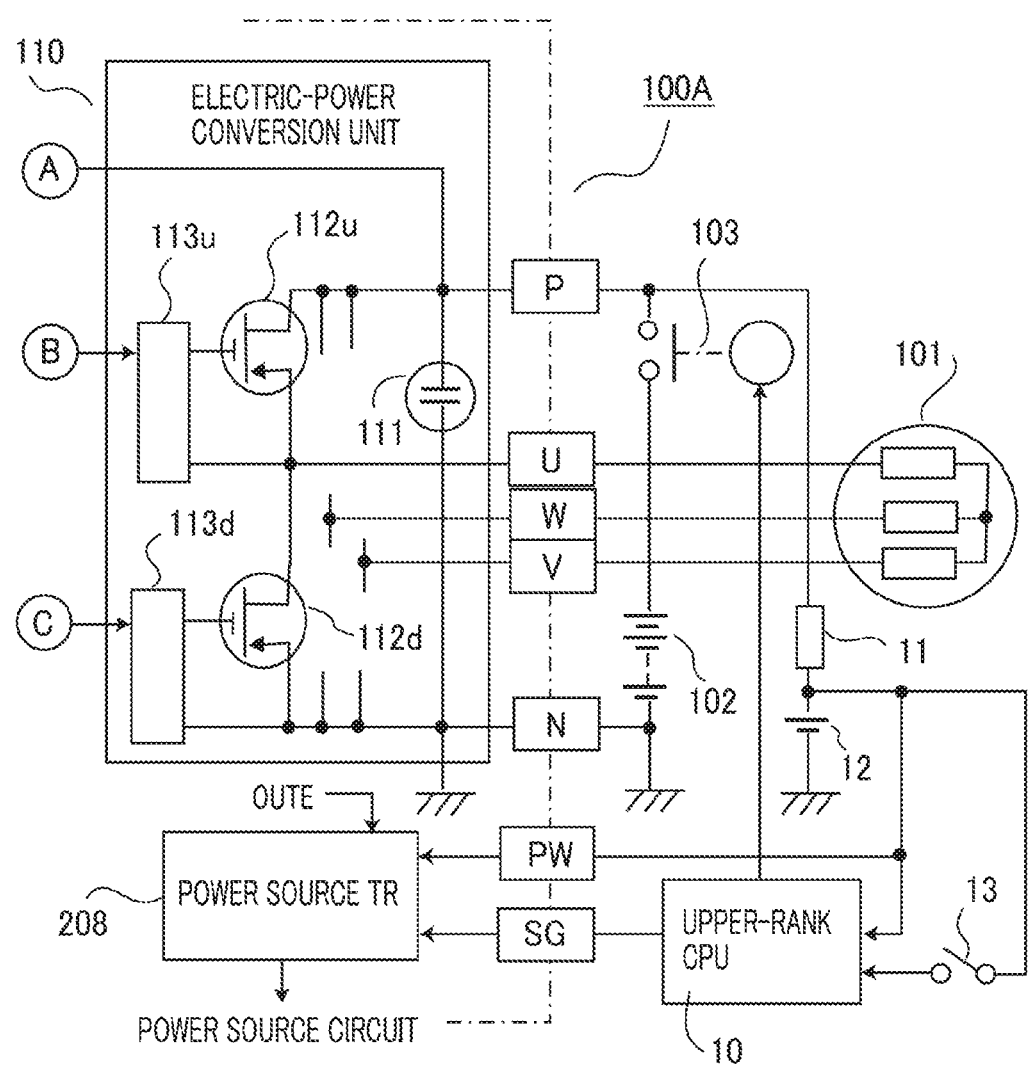

Hereinafter, a motor control apparatus according to Embodiment 1 of the present invention will be explained in detail by use of the drawings. A set of FIGS. 1A and 1B is a block diagram representing the overall circuit of a motor control apparatus according to Embodiment 1 of the present invention. In FIGS. 1A and 1B, a motor control apparatus 100A is provided with an electric-power conversion unit 110 as an electric-power converter, a calculation control unit 120A as a calculation controller, and an abnormality monitoring unit 200 as an abnormality monitor; a low-voltage-system vehicle battery 102 of, for example, DC 48[V] is connected between a positive-side power-source terminal P and a negative-side power-source terminal N by way of an electric power switching device 103. The maximum charging voltage of the vehicle battery 102 is lower than DC 60[V], which is the limit voltage at which there exists no risk of contact electric shock.

Respective windings of a three-phase armature winding in a three-phase AC motor 101 are connected with AC terminals U, V, and W provided in the electric-power conversion unit 110. The three-phase AC motor 101 includes permanent-magnet rotating magnetic poles integrally coupled with an unillustrated vehicle engine and the three-phase armature winding for generating a rotating magnetic field.

An upper-rank CPU 10 integrally controls related apparatuses, including the motor control apparatus 100A, such as an unillustrated engine control apparatus and an unillustrated transmission control apparatus. When being supplied with electric power by an auxiliary battery 12 of, for example, DC 12 [V] system, which is charged with the power-generation voltage of the three-phase AC motor 101 by way of a charging circuit 11, the upper-rank CPU 10 operates; when a power-source switch 13, which is manually closed when driving of a vehicle is started, is closed, the upper-rank CPU 10 drives the electric power switching device 103 to close and drives an power-source switching device 208 provided in the motor control apparatus 100A to close.

One end of the power-source switching device 208 is connected with the auxiliary battery 12 by way of a control power-source terminal PW; the other end of the power-source switching device 208 is connected with the connection point between a step-down circuit 114a included in a control power-source circuit 114 and a stabilized power source circuit 114b. The step-down circuit 114a is supplied with electric power through the positive-side power-source terminal P. A power-source activation command signal SG generated by the upper-rank CPU 10 drives the power-source switching device 208 to close.

In contrast, a microprocessor CPU included in the calculation control unit 120A starts control operation, based on a control voltage Vcc generated by the stabilized power source circuit 114b. Then, a CPU operation detection circuit 209, which is, for example, a watchdog timer, monitors a watchdog signal from the microprocessor CPU, and generates an output permission signal OUTE when the microprocessor CPU normally performs a cyclic calculation. The power-source switching device 208 closes based on the output permission signal OUTE from the CPU operation detection circuit 209, and performs self-holding of the closing state.

As the method for the CPU operation detection circuit 209, there is utilized a Q&A method in which question information is transmitted to the microprocessor CPU in operation and then it is determined whether or not the answer from the microprocessor CPU is correct or a method in which the Q&A method is utilized in combination with a watchdog timer. Accordingly, the upper-rank CPU 10 generates the power-source activation command signal SG so that the auxiliary battery 12 supplies electric power, or the electric power switching device 103 closes so that the vehicle battery 102 supplies electric power. Alternatively, even the electric power switching device 103 is opened, the power-generation voltage of the three-phase AC motor 101 activates the microprocessor CPU, so that the output permission signal OUTE closes the power-source switching device 208, and due to power supply from at least the auxiliary battery 12, the microprocessor CPU can sustain its control operation until the microprocessor CPU autonomously stops its control operation.

In this regard, however, because in order to reduce the load on the auxiliary battery 12, control electric power to be obtained from the vehicle battery 102 makes the calculation control unit 120A operate, the output voltage of the step-down circuit 114a is set to a value that is slightly higher than the power-source voltage of the auxiliary battery 12; thus, in order to prevent a reverse flow from the step-down circuit 114a to the auxiliary battery 12, the power-source switching device 208 has a reverse flow prevention function, or a reverse-flow prevention diode is connected in series with the power-source switching device 208.

The electric-power conversion unit 110 is formed of a three-phase full wave bridge circuit in which three pairs of an upstream switching device 112u and a downstream switching device 112d, which are connected in series with each other, are connected in parallel with one another. Each of the three upstream switching devices 112u and each of the three downstream switching devices 112d may be referred to as an upper-arm device and a lower-arm device, respectively. Each of these switching devices is, for example, a field effect transistor including an internal parasitic diode, which functions as a commutation diode; a power-source capacitor 111, which is formed of, for example, two or more inductive polymer solid-state aluminum electrolytic capacitors or two or more inductive polymer hybrid aluminum electrolytic capacitors are connected in parallel with each other, is connected with in parallel with the three pairs of serial transistor circuits.

An upper gate circuit 113u is connected between the gate terminal and the source terminal of each of the three upstream switching devices 112u; when the logic level of an upper closing command signal Ux2, which is the input signal of the upper gate circuit 113u, is L, the upstream switching device 112u is driven to close. Similarly, a lower gate circuit 113d is connected between the gate terminal and the source terminal of each of the three downstream switching devices 112d; when the logic level of a lower closing command signal Dx2, which is the input signal of the lower gate circuit 113d, is L, the downstream switching device 112d is driven to close.

The calculation control unit 120A is configured mainly with the microprocessor CPU, a nonvolatile program memory PMEM, which is, for example, a flash memory, a nonvolatile data memory DMEM, and a RAM memory RMEM for computing processing. A control signal generation means 121 to be implemented by the microprocessor CPU generates a pulse-width modulation signal PWMx (x=U, V, W); the pulse-width modulation signal PWMx is logically inversed by a logic inverting means 123 so as to generate an inversed PWM signal PWNx (x=U, V, W).

An upper-side penetration prevention means 122 as an upper-side penetration preventer to be implemented by the microprocessor CPU generates an upper closing command signal Ux0 that rises, delayed by a predetermined time $\Delta T$, when the pulse-width modulation signal PWMx rises and that immediately falls when the pulse-width modulation signal PWMx falls. A lower-side penetration prevention means 124 as an lower-side penetration preventer to be implemented by the microprocessor CPU generates a lower closing command signal Dx0 that rises, delayed by a predetermined time ΔT, when the inversed PWM signal PWNx obtained by making the logic inverting means 123 invert the pulse-width modulation signal PWMx rises and that immediately falls when the inversed PWM signal PWNx falls.

The upper closing command signal Ux0 is a signal for driving to close the upstream switching device 112u of x (x=U, V, W) phase when the logic level thereof is H. The lower closing command signal Dx0 is a signal for driving to close the downstream switching device 112d of x (x=U, V, W) phase when the logic level thereof is H. In order to prevent the respective logic levels of the upper closing command signal Ux0 and the lower closing command signal Dx0 from concurrently becoming H, the upper-side penetration prevention means 122 and the lower-side penetration prevention means 124 operate in such a way that the upper switching device and the lower switching device are prevented from causing power-source short-circuiting.

The pulse-width modulation signal PWMx is to apply pseudo sinusoidal wave AC voltages, which have a 120° phase difference from one another, to the upper-arm device. The frequency of the pseudo sinusoidal wave AC voltage is equivalent to the rotation speed of the three-phase AC motor 101; the conduction duty rate of the pulse-width modulation signal PWMx is variably set in accordance with a target motor current and the phase angle of the sinusoidal wave.

When an after-mentioned excessive voltage detection unit 201 as an excessive voltage detector generates an excessive voltage detection signal, the microprocessor CPU generates an upper three-phase short-circuiting command signal US or a lower three-phase short-circuiting command signal DS and then performs driving to close the upper-arm devices or the lower-arm devices. When an after-mentioned excessive current detection unit 203 as an excessive current detector generates an excessive current detection signal, the microprocessor CPU generates an upper-and-lower six-phase cutoff command signal UDO so as to cut off all of the upper-arm devices or the lower-arm devices.

These control signals to be generated by the microprocessor CPU and an upper three-phase first command signal UO, a lower three-phase first command signal DO, an upper closing command signal Ux1, and a lower closing command signal Dx1 that are dealt with by a selection circuit 210, an upper selection circuit 130u, a lower selection circuit 130d, and a penetration prevention circuit 140 will be explained in detail in FIG. 2.

Various abnormality detection signals ER generated by the abnormality monitoring unit 200 are inputted to the microprocessor CPU. The excessive voltage detection unit 201 included in the abnormality monitoring unit 200 detects the voltage across the power-source capacitor 111 and generates the excessive voltage detection signal when the voltage across the power-source capacitor 111 is the same as or higher than a predetermined determination threshold value voltage (e.g., DC 60[V]).

A device abnormality detection unit 202 as a device abnormality detector determines whether or not there exists a disconnection abnormality and/or a short-circuit abnormality in each of the upstream switching devices 112u and the downstream switching devices 112d; in the case where even when a closing command signal is provided, the switching device is opened, the device abnormality detection unit 202 generates a disconnection abnormality detection signal; in the case where even when an opening command signal is provided, the switching device is closed, the device abnormality detection unit 202 generates a short-circuit abnormality detection signal.

By use of current sensors, the excessive current detection unit 203 detects currents flowing in the windings of at least two phases among the three-phase armature windings of the three-phase AC motor 101; when the current is the same as or larger than a first determination threshold value current (e.g., 600[A]), the excessive current detection unit 203 generates a load short-circuit abnormality detection signal; when the current flowing in each of the upstream switching device 112u and the downstream switching device 112d is the same as or larger than a second determination threshold value current (e.g., 2000[A]), the excessive current detection unit 203 generates a short-circuit excessive current detection signal indicating that the upper and lower switching devices of one and the same phase are conductive in a penetrating manner and that at least one of the upper and lower switching devices has a short-circuit abnormality.

The current flowing in the switching device is detected by measuring the voltage across the closed switching device. An upper device short-circuit detection storage circuit 205u stores the short-circuit abnormality detection signal when a short-circuit abnormality occurs in any one of the upstream switching devices 112u, and then generates a lower three-phase cutoff second command signal DOO and inputs it to the lower selection circuit 130d. A lower device short-circuit detection storage circuit 205d stores the short-circuit abnormality detection signal when a short-circuit abnormality occurs in any one of the downstream switching devices 112d, and then generates an upper three-phase cutoff second command signal UOO and inputs it to the upper selection circuit 130u.

Figure 2:
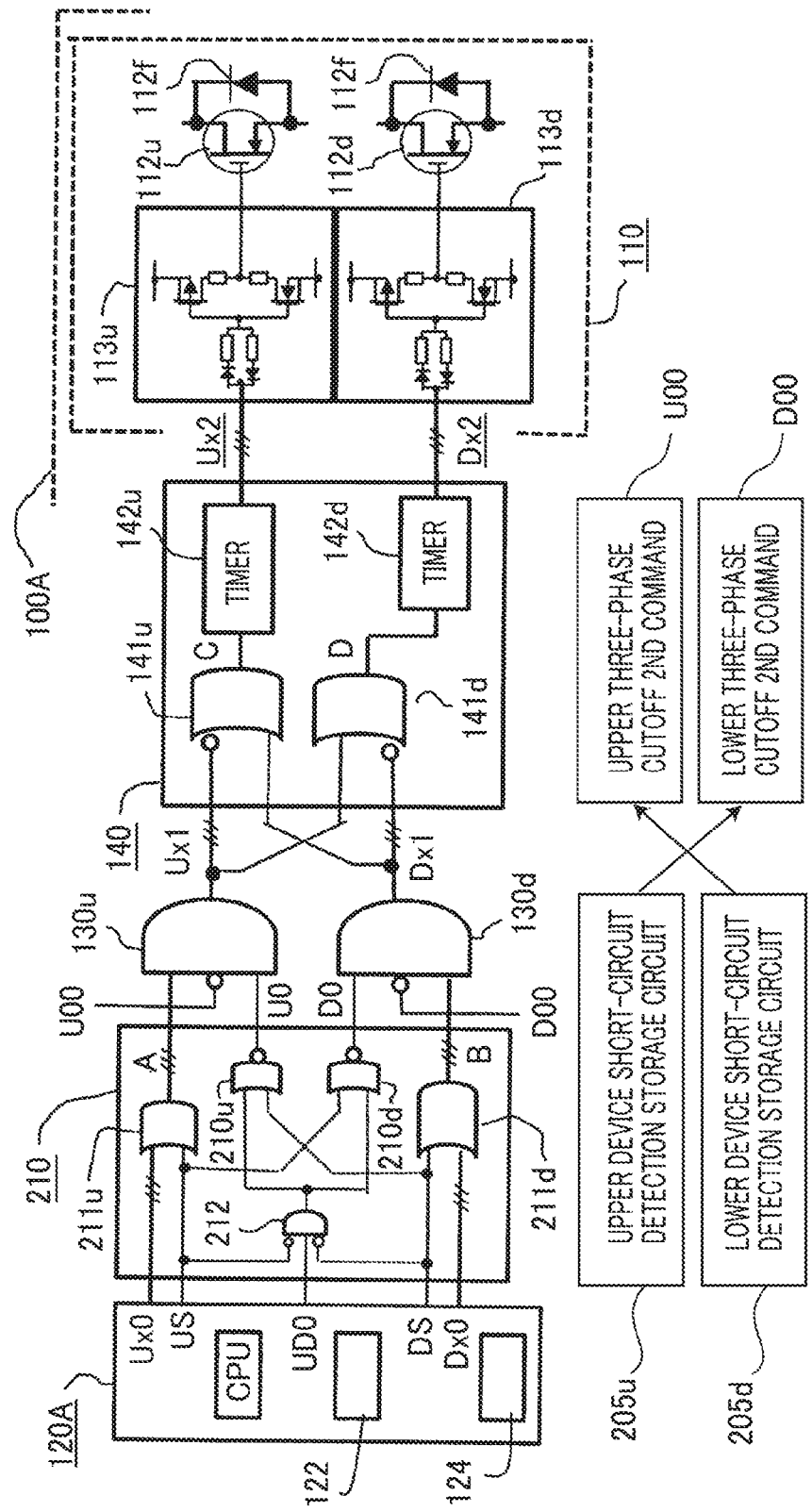
FIG. 2 is a detailed block diagram representing part of the motor control apparatus according to Embodiment 1 of the present invention.

FIG. 2 is a detailed block diagram representing part of the motor control apparatus according to Embodiment 1 of the present invention; FIG. 2 represents the details of the selection circuit 210, the upper selection circuit 130u, the lower selection circuit 130d, and the penetration prevention circuit 140. In FIG. 2, the selection circuit 210, which is shared by the upper selection circuit 130u and the lower selection circuit 130d, is provided at the front stage portions thereof. An upper closing synthetic circuit 211u included in the selection circuit 210 is an OR device for the upper closing command signal Ux0 and the upper three-phase short-circuiting command signal US that are generated by the calculation control unit 120A; the OR output A thereof becomes the upper closing command signal Ux1 through the intermediary of the upper selection circuit 130u, which functions as an AND gate device, and is inputted to the penetration prevention circuit 140.

Similarly, a lower closing synthetic circuit 211d is an OR device for the lower closing command signal Dx0 and the lower three-phase short-circuiting command signal DS that are generated by the calculation control unit 120A; the OR output B thereof becomes the lower closing command signal Dx1 through the intermediary of the lower selection circuit 130d, which functions as an AND gate device, and is inputted to the penetration prevention circuit 140.

When both the respective logic levels of the upper three-phase short-circuiting command signal US and the lower three-phase short-circuiting command signal DS are L and hence no short-circuit signal has been generated, and the logic level of the upper-and-lower six-phase cutoff command signal UDO is H, the output logic level of a short-circuit command signal priority circuit 212 becomes "H";

the "H"-level signal is inputted to the upper selection circuit 130u and the lower selection circuit 130d, by way of an upper cutoff synthetic circuit 210u and a lower cutoff synthetic circuit 210d, respectively, which are NOR devices. Thus, the logic levels of the upper closing command signal Ux1 and the lower closing command signal Dx1, which are the outputs of the upper selection circuit 130u and the lower selection circuit 130d, respectively, are determined as L; as a result, the opening command signal is generated for each of the upstream switching devices 112u and the downstream switching devices 112d.

However, when the logic level of any one of the upper three-phase short-circuiting command signal US and the lower three-phase short-circuiting command signal DS becomes H and hence the three-phase short-circuiting command signal is generated, the short-circuit command signal priority circuit 212 neglects the cutoff command signal, for example, even when the logic level of the upper-and-lower six-phase cutoff command signal UDO is H. It may be allowed that the respective functions of the short-circuit command signal priority circuit 212, the upper cutoff synthetic circuit 210u, and the lower cutoff synthetic circuit 210d, which are formed of hardware, are performed by the microprocessor CPU and that the microprocessor CPU generates an upper three-phase cutoff first command signal UO or a lower three-phase cutoff first command signal DO, instead of the upper-and-lower six-phase cutoff command signal UDO.

In contrast, when the upper three-phase short-circuiting command signal US is generated and the logic level thereof becomes H, the logic level of the lower three-phase cutoff first command signal DO that is inputted to the lower selection circuit 130d by way of the lower cutoff synthetic circuit 210d becomes L. Thus, the logic level of the lower closing command signal Dx1 becomes L and hence the opening command signal is provided to each of the downstream switching devices 112d.

Similarly, when the lower three-phase short-circuiting command signal DS is generated and the logic level thereof becomes H, the logic level of the upper three-phase cutoff first command signal UO that is inputted to the upper selection circuit 130u by way of the upper cutoff synthetic circuit 210u becomes L. Thus, the logic level of the upper closing command signal Ux1 becomes L and hence the opening command signal is provided to each of the upstream switching devices 112u.

When the lower three-phase cutoff second command signal DOO is generated by the upper device short-circuit detection storage circuit 205u and is inputted to the lower selection circuit 130d, the logic level of the lower closing command signal Dx1 becomes L and hence the opening command signal is provided to each of the downstream switching devices 112d, so that the upper-and-lower switching devices are prevented from being short-circuited. When the upper three-phase cutoff second command signal UOO is generated by the lower device short-circuit detection storage circuit 205d and is inputted to the upper selection circuit 130u, the logic level of the upper closing command signal Ux1 becomes L and hence the opening command signal is provided to each of the upstream switching devices 112u, so that the upper-and-lower switching devices are prevented from being short-circuited.

In this regard, however, the abnormality detection signal ER is inputted to the microprocessor CPU so that in order to prevent the occurrence of upper-and-lower short-circuiting, the upper three-phase short-circuiting command signal US or the lower three-phase short-circuiting command signal DS is generated. Accordingly, the lower three-phase cutoff second command signal DOO and the upper three-phase cutoff second command signal UOO are configured as dual-system protection measures.

In other words, in response to a device abnormality detection signal generated by the device abnormality detection unit 202, the microprocessor CPU selects the upper three-phase short-circuiting command signal US or the lower three-phase short-circuiting command signal DS. In the case where any one of the group of the upstream switching devices 112u and the group of the downstream switching devices 112d includes a disconnection abnormality switching device, the upper three-phase short-circuiting command signal US or the lower three-phase short-circuiting command signal DS is applied to the other one thereof that does not include the disconnection abnormality switching device; in the case where any one of the group of the upstream switching devices 112u and the group of the downstream switching devices 112d includes a short-circuit abnormality switching device, the upper three-phase short-circuiting command signal US or the lower three-phase short-circuiting command signal DS is applied to the one thereof that includes the short-circuit abnormality switching device.

FIG. 3A is an explanatory table representing the logic states of control signals generated by the selection circuits in the motor control apparatus according to Embodiment 1 of the present invention; FIG. 3A represents the logic levels of the OR outputs A and B corresponding to the respective logic levels of the upper three-phase short-circuiting command signal US, the lower three-phase short-circuiting command signal DS, and the upper-and-lower six-phase cutoff command signal UDO that are generated by the microprocessor CPU and the upper three-phase cutoff first command signal UO and the lower three-phase cutoff first command signal DO that are generated by the selection circuit 210.

FIG. 3B is an explanatory table representing the logic list of the input signals for the upper-arm and lower-arm selection circuits in the motor control apparatus according to Embodiment 1 of the present invention; FIG. 3B represents the relationship between the upper closing command signal Ux1, which is the logic combination output of the OR output A, the upper three-phase cutoff first command signal UO, the upper three-phase cutoff second command signal UOO that are inputted to the upper selection circuit 130u, and the lower closing command signal Dx1, which is the logic combination output of the OR output B, the lower three-phase cutoff first command signal DO, and the lower three-phase cutoff second command signal DOO that are inputted to the lower selection circuit 130d.

As is clear from FIGS. 3A and 3B, when all of the respective logic levels of the upper three-phase short-circuiting command signal US, the lower three-phase short-circuiting command signal DS, and the upper-and-lower six-phase cutoff command signal UDO are L and neither short-circuiting command signal nor cutoff command signal exists, the first-stage upper closing command signal Ux0 and the middle-stage upper closing command signal Ux1 have one and the same logic, and the first-stage lower closing command signal Dx0 and the middle-stage lower closing command signal Dx1 have one and the same logic.

However, when the logic level of the upper three-phase cutoff second command signal UOO is H, the logic level of the middle-stage upper closing command signal Ux1 is determined as L and hence the upper-arm devices are cut off; when the logic level of the lower three-phase cutoff second command signal DOO is H, the logic level of the middle-stage lower closing command signal Dx1 is determined as L and hence the upper-arm devices are cut off.

In the case where when all of the respective logic levels of the upper three-phase cutoff second command signal UOO, the lower three-phase cutoff second command signal DOO, and the upper-and-lower six-phase cutoff command signal UDO are L, the logic level of the upper three-phase short-circuiting command signal US is H, the logic level of the middle-stage upper closing command signal Ux1 is determined as H and hence the upper-arm devices are driven to be short-circuited; in the case where when all of the respective logic levels of the upper three-phase cutoff second command signal UOO, the lower three-phase cutoff second command signal DOO, and the upper-and-lower six-phase cutoff command signal UDO are L, the logic level of the lower three-phase short-circuiting command signal DS is H, the logic level of the middle-stage lower closing command signal Dx1 is determined as H and hence the upper-arm devices are driven to be short-circuited.

However, when both the respective logic levels of the upper three-phase short-circuiting command signal US and the lower three-phase short-circuiting command signal DS are L and hence no short-circuiting command signal exists, and the logic level of the upper-and-lower six-phase cutoff command signal UDO is H and hence the cutoff command signal has been generated, both the respective logic levels of the middle-stage upper closing command signal Ux1 and the middle-stage lower closing command signal Dx1 become L and hence all of the upper-arm devices and the lower-arm devices are cut off.

Meanwhile, in the penetration prevention circuit 140, the inverted logic signal of the middle-stage upper closing command signal Ux1 and the middle-stage lower closing command signal Dx1 are inputted to an upper inversion coupling circuit 141u; the OR output C thereof is outputted as a post-stage upper closing command signal Ux2 by way of an upper penetration prevention timer 142u. Similarly, the inverted logic signal of the middle-stage lower closing command signal Dx1 and the middle-stage upper closing command signal Ux1 are inputted to a lower inversion coupling circuit 141d; the OR output D thereof is outputted as a post-stage lower closing command signal Dx2 by way of a lower penetration prevention timer 142d.

The upper penetration prevention timer 142u is a hardware timer that falls in a delay time Δt after the fall of the OR output C and rises immediately after the rise of the OR output C; the upper penetration prevention timer 142u prevents both the respective logic levels of the post-stage upper closing command signal Ux2 and the post-stage lower closing command signal Dx2, which are logically inverted, from concurrently becoming L. Similarly, the lower penetration prevention timer 142d is a hardware timer that falls in a delay time Δt after the fall of the OR output D and rises immediately after the rise of the OR output D; the lower penetration prevention timer 142d prevents both the respective logic levels of the post-stage upper closing command signal Ux2 and the post-stage lower closing command signal Dx2, which are logically inverted, from concurrently becoming L.

FIG. 3C is an explanatory table representing the logic list of input/output signals for the penetration prevention circuit in the motor control apparatus according to Embodiment 1 of the present invention; FIG. 3C represents the respective output logics of the OR outputs C and D corresponding to the logic levels of the middle-stage upper closing command signal Ux1 and the middle-stage lower closing command signal Dx1, which are inputted to the penetration prevention circuit 140. As represented in FIG. 3C, the logic levels of the upper closing command signal Ux2 and the post-stage lower closing command signal Dx2 become L in the delay time Δt after the logics of the OR outputs C and D, respectively, are outputted.

As is clear from FIG. 3C, the post-stage upper closing command signal Ux2 becomes the inverted logic signal of the middle-stage upper closing command signal Ux1, and the post-stage lower closing command signal Dx2 is the middle-stage lower closing command signal Dx1; when the logic level of the post-stage upper closing command signal Ux2 becomes L, the upstream switching devices 112u is driven to close. Similarly, the post-stage upper closing command signal Ux2 becomes the inverted logic signal of the middle-stage upper closing command signal Ux1, and the post-stage lower closing command signal Dx2 is the middle-stage lower closing command signal Dx1; when the logic level of the post-stage lower closing command signal Dx2 becomes L, the downstream switching device 112d is driven to close.

In the case where there exist an inappropriate command signal that cause both the respective logic levels of the upper closing command signal Ux1 and the lower closing command signal Dx1 to become H, both the respective logic levels of the upper closing command signal Ux2 and the lower closing command signal Dx2 become H and hence the upstream switching device 112u or the downstream switching device 112d is cut off.

Due to the effects, of the upper-side penetration prevention means 122 and the lower-side penetration prevention means 124, that are produced by the microprocessor CPU, even in the period where both the respective logic levels of the upper closing command signal Ux1 and the lower closing command signal Dx1 to become L, both the respective logic levels of the upper closing command signal Ux2 and the lower closing command signal Dx2 become H and hence the upstream switching device 112u or the downstream switching device 112d is cut off.

(2) Detailed Description of Effect and Operation

Figure 4A:
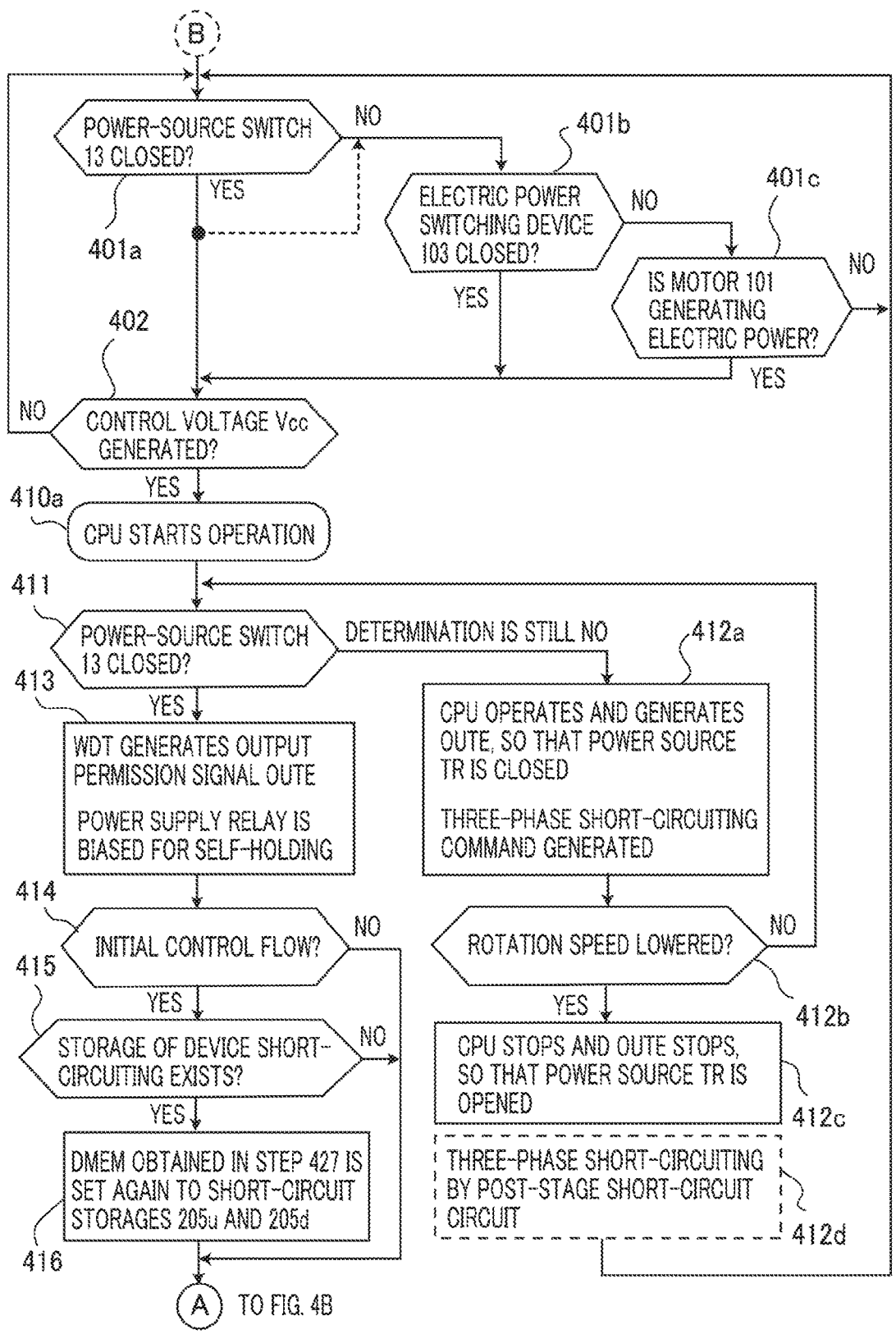
FIG. 4A is the former half of a flowchart representing the control operation of the motor control apparatus according to each of Embodiments 1 and 2 of the present invention.
Figure 4B:
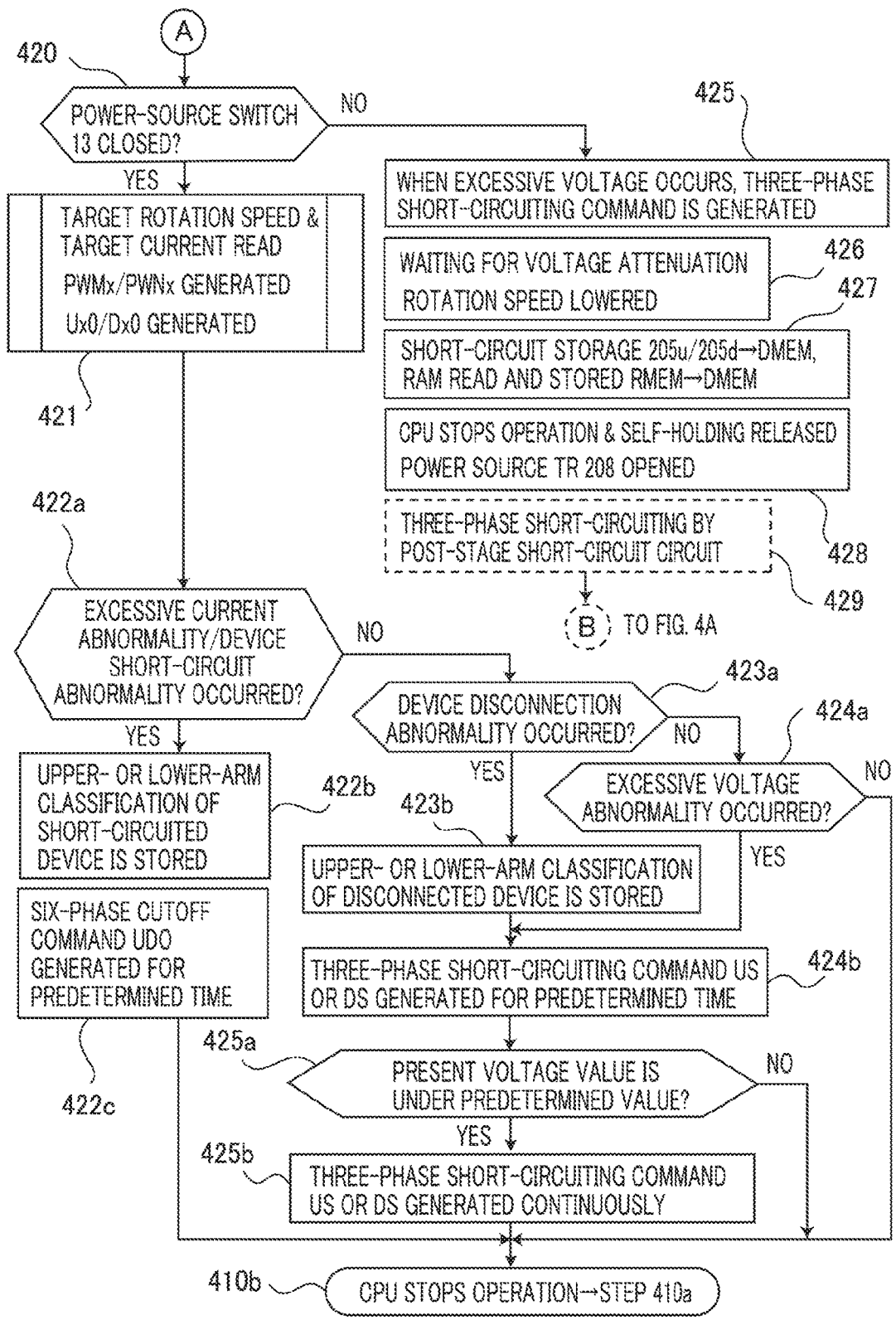
FIG. 4B is the latter half of the flowchart representing the control operation of the motor control apparatus according to each of Embodiments 1 and 2 of the present invention.

Next, the effect and the operation of the motor control apparatus 100A according to Embodiment 1 of the present invention, configured as illustrated in foregoing FIGS. 1A and 1B and FIG. 2, will be explained in detail. FIG. 4A is the former half of a flowchart representing the control operation of the motor control apparatus according to each of Embodiment 1 and after-mentioned Embodiment 2 of the present invention. FIG. 4B is the latter half of a flowchart representing the control operation of the motor control apparatus according to each of Embodiment 1 and after-mentioned Embodiment 2 of the present invention.

At first, when in FIGS. 1A and 1B representing the overall-circuit block diagram, the power-source switch 13 is manually closed, the upper-rank CPU 10 closes the electric power switching device 103 and hence the vehicle battery 102 applies a DC voltage of, for example, DC 48[V] between the positive-side power-source terminal P and the negative-side power-source terminal N, and the power-source activation command signal SG from the upper-rank CPU 10 drives and closes the power-source switching device 208 in the motor control apparatus 100A.

As a result, the stabilized power source circuit 114b is supplied with electric power by the vehicle battery 102 or the auxiliary battery 12, by way of the step-down circuit 114a or the power-source switching device 208, and then generates the control voltage Vcc. As a result, the microprocessor CPU is activated, and the CPU operation detection circuit 209 generates the output permission signal OUTE.

Accordingly, the power-source switching device 208 is closed and performs self-holding of the closing mode. While performing signal communication with the upper-rank CPU 10, the microprocessor CPU performs power-running drive control of the three-phase AC motor 101 and regenerative charge control of the vehicle battery 102.

In FIG. 4A, the step 401*a* following the relay terminal B, which is a preparation starting point for the control operation, is a first inspection step in which attention is drew to whether or not the power-source switch 13 has been closed, in which in the case where the power-source switch 13 has been closed, the result of the determination becomes "YES", and then the step 401*a* is followed by the step 402, and in which in the case where the power-source switch 13 has not been closed, the result of the determination becomes "NO", and then the step 401*a* is followed by the step 401*b*.

The step 401*b* is a second inspection step in which attention is drew to whether or not the electric power switching device 103 has been closed, in which in the case where the electric power switching device 103 has been closed or has a short-circuit abnormality, the result of the determination becomes "YES", and then the step 401*b* is followed by the step 402, and in which in the case where the electric power switching device 103 has not been closed, the result of the determination becomes "NO", and then the step 401*b* is followed by the step 401*c*. When the power-source switch 13 is closed, the electric power switching device 103 performs closing operation; however, in the case where even when the power-source switch 13 is opened, the electric power switching device 103 is performing self-holding closing operation or has a short-circuit abnormality, the result of the determination in the step 401*b* becomes "YES".

The step 401*c* is a third inspection step in which in the case where for example, although due to a disconnection abnormality in the electric power switching device 103, supply of electric power from the vehicle battery 102 to the three-phase AC motor 101 is stopped, the vehicle engine performs unassisted operation to make the vehicle travel, or in the case where while the vehicle travels, the power-source switch 13 is opened and hence inertial traveling or descending-road traveling is performed, it is determined whether or not the three-phase AC motor 101 generates a power-generation voltage; in the case where the three-phase AC motor 101 generates a power-generation voltage, the result of the determination becomes "YES" and then the step 401*c* is followed by the step 402; in the case where the three-phase AC motor 101 does not generate any power-generation voltage, the result of the determination becomes "NO" and then the step 401*a* is resumed.

The step 402 is a fourth inspection step in which it is determined whether or not because due to the step 401*a*, the control power source is supplied from the auxiliary battery 12, because due to the step 401*b*, the control power source is supplied from the vehicle battery 102, or because due to the step 401*c*, the control power source is supplied from the three-phase AC motor 101, the stabilized power source circuit 114*b* generates the control voltage Vcc; in the case where the stabilized power source circuit 114*b* does not generate the control voltage Vcc, the result of the determination becomes "NO" and then the step 401*a* is resumed; in the case where the stabilized power source circuit 114*b* generates the control voltage Vcc, the result of the determination becomes "YES" and then the step 402 is followed by the step 410*a*.

The steps 401*a* through 402 are virtual reference steps for making it clear from where the supply of electric power to the microprocessor CPU is performed and are not implemented by the microprocessor CPU.

In the step 410*a*, the microprocessor CPU starts its control operation; in the following step 411, it is determined whether or not the power-source switch 13 has been closed; in the case where it is recognized that the power-source switch 13 has been closed, the result of the determination becomes "YES" and then the step 411 is followed by the step 413; in the case where it is not recognized that the power-source switch 13 has been closed, the result of the determination becomes "NO" and then the step 411 is followed by the step 412*a*.

In the step 412*a*, because the CPU operation detection circuit 209 generates the output permission signal OUTE and hence the power-source switching device 208 is closed, a stable power source is supplied from the auxiliary battery 12, and the microprocessor CPU generates the upper three-phase short-circuiting command signal US or the lower three-phase short-circuiting command signal DS and hence the power-generation voltage of the three-phase AC motor 101 is suppressed.

In the following step 412*b*, it is determined whether or not the rotation speed of the vehicle engine, i.e., the rotation speed of the three-phase AC motor 101 has become a predetermined threshold-value rotation speed or lower; in the case where the rotation speed of the three-phase AC motor 101 has not become the predetermined threshold-value rotation speed or lower, the result of the determination becomes "NO" and the step 411 is resumed; after that, circulation operation in the steps 411, 412*a*, and 412*b* in that order is performed; when in due course of time, the result of the determination in the step 412*b* becomes "YES", the step 412*b* is followed by the step 412*c*.

The threshold-value rotation speed in the step 412*b* is a measured statistic value obtained from two or more samples, at which the power-generation voltage of the three-phase AC motor 101 becomes lower than DC 60[V] under a no-load rotation state where the electric power switching device 103, the upstream switching device 112*u*, and the downstream switching device 112*d* are all opened.

In the step 412*c*, the microprocessor CPU autonomously stops; as a result, the CPU operation detection circuit 209 stops generation of the output permission signal OUTE and hence the power-source switching device 208 is opened. The step 412*d* indicated by a dotted line relates to after-mentioned Embodiment 2, and the explanation therefor will be omitted here; the step 412*c* is followed by the virtual determination performed in the step 401*a*.

In contrast, in the case where even when the power-source switch 13 is opened, the electric power switching device 103 is closed or has a short-circuit abnormality, there is created a circulation step in which the steps 401*a*, 401*b*, 402, 410*a*, 411, 412*a*, 412*b*, and 412*c* are circularly implemented in that order; thus, based on an unillustrated step, an abnormality is notified to the upper-rank CPU 10. Therefore, the process from the step 411 to the step 412*c* is a control flow under the condition that the power-source switch 13 has not been closed; the microprocessor CPU prevents the three-phase AC motor 101 from causing an excessive voltage abnormality so that the circuit components in the electric-power conversion unit 110 are not broken by an excessive voltage.

In the step 413 where the power-source switch 13 has been closed, when the CPU operation detection circuit 209 generates the output permission signal OUTE, the power-source switching device 208 is closed and hence the microprocessor CPU is supplied with a stable power source by the auxiliary battery 12; then, the step 413 is followed by the step 414. In this regard, however, when the electric power switching device 103 is closed, the microprocessor CPU operates based on the power source at the vehicle battery 102 side; even in this case, it is determined in the step 411 whether or not the present state is a vehicle driving state in which the power-source switch 13 is closed.

The following step 414 is a determination step in which it is determined whether or not the present control operation is the initial control operation after the power-source switch 13 has been closed; in the case where the present control operation is the initial operation, the result of the determination becomes "YES", and then, the step 414 is followed by the step 415; in the case where the present control operation is not the initial operation, the result of the determination becomes "NO", and then, the step 414 is followed by the step 420 represented in FIG. 4A, by way of the relay terminal A.

The step 415 is a determination step in which it is determined whether or not there exists an history of a switching device short-circuit abnormality that has been stored in the data memory DMEM in the after-mentioned step 427; in the case where there exists a short-circuit history, the result of the determination becomes "YES", and then, the step 415 is followed by the step 416; in the case where there exists no short-circuit history, the result of the determination becomes "NO", and then, the step 415 is followed by the step 420 in FIG. 4B.

In the step 416, based on historical information on a short-circuit abnormality written and stored in the step 427 in FIG. 4B, the upper device short-circuit detection storage circuit 205u or the lower device short-circuit detection storage circuit 205d is reset; then, the step 416 is followed by the step 420 in FIG. 4B. In FIG. 4B, the step 420 is a determination step in which it is reconfirmed whether or not the power-source switch 13 has been closed; in the case where the power-source switch 13 is still closed, the result of the determination becomes "YES", and then the step 420 is followed by the step 421; in the case where the present state is an operation-stop state in which the power-source switch 13 that has been opened is closed, the result of the determination becomes "NO", and then, the step 420 is followed by the step 425.

In the step 425, when the excessive voltage detection unit 201 has generated an excessive voltage abnormality detection signal, the upper three-phase short-circuiting command signal US or the lower three-phase short-circuiting command signal DS is generated so that the power-generation voltage of the three-phase AC motor 101 is suppressed. In the following step 426, there is waited the timing at which the rotation speed of the three-phase AC motor 101 falls to the predetermined threshold-value rotation speed, described in the step 412b, or lower and the voltage is attenuated.

In the following step 427, short-circuit storage information, on the upper device short-circuit detection storage circuit 205u or the lower device short-circuit detection storage circuit 205d, that has been stored in the after-mentioned step 422b, is transmitted to and retained in the nonvolatile data memory DMEM; concurrently, other learning information items or abnormality storage information items that have been written in the RAM memory RMEM are transmitted to and retained in the data memory DMEM.

In the following step 428, because the microprocessor CPU autonomously stops and, as a result, the CPU operation detection circuit 209 stops generation of the output permission signal OUTE, the power-source switching device 208 is opened and hence the supply of electric power from the auxiliary battery 12 is stopped; after that, the step 428 is followed by the step 401a in FIG. 4A, by way of the relay terminal B.

The step 429, represented by a dotted line relates to Embodiment 2; thus, the explanation therefor will be omitted here.

The process from the step 420 to the step 428 is a processing process from the timing when the power-source switch 13 is opened to the timing when the microprocessor CPU autonomously stops.

In the step block 421 that is implemented when the closing state of the power-source switch 13 is detected in the step 420, the rotation speed of the three-phase AC motor 101 is detected by use of an unillustrated motor rotation sensor (or engine rotation sensor) so that the rotation speed of the rotating magnetic field generated by the three-phase armature winding is determined; concurrently, in accordance with the target current transmitted from the upper-rank CPU 10, the upper closing command signal Ux0 and the lower closing command signal Dx0 are generated based on the pulse-width modulation signal PWMx, the inversed PWM signal PWNx, the upper-side penetration prevention means 122, and the lower-side penetration prevention means 124 corresponding to each of U, V, and W phases.

The following step 422a is a determination step in which it is determined whether or not the excessive current detection unit 203 generates an excessive-current abnormality detection signal or whether or not the device abnormality detection unit 202 has generated the short-circuit abnormality detection signal regarding a switching device; in the case where an abnormality occurs, the result of the determination becomes "YES", and then, the step 422a is followed by the step 422b; in the case where no abnormality occurs, the result of the determination becomes "NO", and then, the step 422a is followed by the step 423a.

In the step 422b, when there exists a switching device having a short-circuit abnormality, it is determined to which one of the upper-arm and lower-arm groups the switching device having a short-circuit abnormality belongs; then, the short-circuit abnormality is categorized into an upstream switching device short-circuit abnormality or a downstream switching device short-circuit abnormality and is stored in the RAM memory RMEM; after that, the step 422b is followed by the step 422c.

In the step 422c, the upper-and-lower six-phase cutoff command signal UDO is generated, and after the excessive current reduces, the step 422c is followed by the operation stopping step 410b. The step 423a is a determination step in which it is determined whether or not the device abnormality detection unit 202 has generated a switching-device disconnection abnormality detection signal; in the case where an abnormality occurs, the result of the determination becomes "YES", and then, the step 423a is followed by the step 423b; in the case where no abnormality occurs, the result of the determination becomes "NO", and then, the step 423a is followed by the step 424a.

In the step 423b, it is determined to which one of the upper-arm and lower-arm groups the switching device having a disconnection abnormality belongs; then, the disconnection abnormality is categorized into an upstream switching device disconnection abnormality or a downstream switching device disconnection abnormality and is stored in the RAM memory RMEM; after that, the step 423b is followed by the step 424b.

The step 424a is a determination step in which it is determined whether or not the excessive voltage detection unit 201 has generated the excessive voltage abnormality detection signal; in the case where an abnormality occurs, the result of the determination becomes "YES", and then, the step 424*a* is followed by the step 424*b*; in the case where no abnormality occurs, the result of the determination becomes "NO", and then, the step 424*a* is followed by the operation stopping step 410*b*. In the step 424*b*, the upper three-phase short-circuiting command signal US or the lower three-phase short-circuiting command signal DS is generated for a predetermined time, and after the detection voltage falls, the step 424*b* is followed by the step 425*a*.

In the step 425*a*, it is determined whether or not the detection voltage of the excessive voltage detection unit 201 has fallen to the minimum voltage of the vehicle battery 102 or lower; in the case where the detection voltage of the excessive voltage detection unit 201 is the same as or lower than the minimum voltage of the vehicle battery 102, the result of the determination becomes "YES", and then, the step 425*a* is followed by the step 425*b*; in the case where the detection voltage of the excessive voltage detection unit 201 is not the same as or lower than the minimum voltage of the vehicle battery 102, the result of the determination becomes "NO", and then, the step 425*a* is followed by the operation stopping step 410*b*. In this situation, the fact that it is determined in the step 425*a* that the detection voltage of the excessive voltage detection unit 201 is the same as or lower than the minimum voltage of the vehicle battery 102 suggests that the electric power switching device 103 is opened or has a disconnection abnormality. In the step 425*b*, the upper three-phase short-circuiting command signal US or the lower three-phase short-circuiting command signal DS is continuously generated; then, the step 425*b* is followed by the operation stopping step 410*b*.

In each of the steps 424*b* and 425*b*, in the case where any one of the group of the upstream switching devices 112*u* and the group of the downstream switching devices 112*d* includes a short-circuit abnormality switching device, the upper three-phase short-circuiting command signal US or the lower three-phase short-circuiting command signal DS is applied to the one thereof that includes the short-circuit abnormality switching device; in the case where any one of the group of the upstream switching devices 112*u* and the group of the downstream switching devices 112*d* includes a disconnection abnormality switching device, the upper three-phase short-circuiting command signal US or the lower three-phase short-circuiting command signal DS is applied to the one thereof that does not include the disconnection abnormality switching device.

In the operation stopping step 410*b*, the microprocessor CPU implements the other control programs; then, for example, within 5 [msec], the operation starting step 410*a* is resumed and then a series of control programs are recurrently implemented.

(3) Gist and Feature of Embodiment 1

As is clear from the foregoing explanation, for the three-phase AC motor 101 having the permanent-magnet rotating magnetic poles integrally coupled with a vehicle engine and the three-phase armature winding for creating a rotating magnetic field, the motor control apparatus 100A according to Embodiment 1 of the present invention is provided with the electric-power conversion unit 110 that is supplied with electric power by the low-voltage-system vehicle battery 102 of a voltage under DC 60[V], by way of the electric power switching device 103, the calculation control unit 120A for the electric-power conversion unit 110, and the abnormality monitoring unit 200; three pairs of upstream switching device 112*u* and the downstream switching device 112*d*, which are transistors, with each of which a commutation diode 112*f* is connected in parallel, and the power-source capacitor 111 are connected in parallel with the foregoing electric-power conversion unit 110; the foregoing calculation control unit 120A is provided with the microprocessor CPU that creates control signals for performing on/off control of the transistors so as to implement driving control of the three-phase AC motor 101 and charge control of the vehicle battery 102 and the nonvolatile program memory PMEM that collaborates with the microprocessor CPU; the foregoing abnormality monitoring unit 200 includes the excessive voltage detection unit 201 for the power-source capacitor 111, the device abnormality detection unit 202 that individually detects a disconnection abnormality or a short-circuit abnormality in each of the foregoing transistors, and the excessive current detection unit 203 for electric currents flowing in the foregoing armature windings of at least two phases among the three phases or an electric current flowing in each of the foregoing upstream switching device 112*u* and the downstream switching device 112*d*.

The foregoing microprocessor CPU generates the pulse-width modulation signal PWMx (x=U, V, or W) for each of the foregoing upstream switching devices 112*u* and the inversed PWM signal PWNx, which is the inverted logic signal of the pulse-width modulation signal PWMx, for each of the foregoing downstream switching devices 112*d*; the upstream switching devices 112*u* and the downstream switching devices 112*d* are connected with the respective windings of U, V, and W phase, which have 120° phase difference from one another, in the foregoing three-phase AC motor 101.

The foregoing microprocessor CPU further includes the upper-side penetration prevention means 122 and the lower-side penetration prevention means 124; the foregoing upper-side penetration prevention means 122 generates the upper closing command signal Ux0 in the delay time ΔT after the foregoing pulse-width modulation signal PWMx is generated; the foregoing upper closing command signal Ux0 drives to close the foregoing upstream switching device 112*u* by way of the upper selection circuit 130*u* and the penetration prevention circuit 140; the foregoing lower-side penetration prevention means 124 generates the lower closing command signal Dx0 in the delay time ΔT after the foregoing inversed PWM signal PWNx is generated; the foregoing lower closing command signal Dx0 drives and closes the foregoing downstream switching device 112*d* by way of the lower selection circuit 130*d* and the foregoing penetration prevention circuit 140; the foregoing upper-side penetration prevention means 122 and the foregoing lower-side penetration prevention means 124 prohibit the respective closing command signals for the foregoing upstream switching device 112*u* and the foregoing downstream switching device 112*d* from being concurrently generated.

Each of the foregoing upper-side penetration prevention means 122 and the foregoing lower-side penetration prevention means 124 is configured by a software means, the processing of which is performed by the microprocessor CPU.

The foregoing penetration prevention circuit 140 includes the upper penetration prevention timer 142*u* and the lower penetration prevention timer 142*d*; the penetration prevention timers are hardware means that prohibit the respective closing command signals for the foregoing upstream switching device 112*u* and the foregoing downstream switching device 112*d* from being concurrently generated; in response to the abnormality detection signal ER inputted from the foregoing abnormality monitoring unit 200, the foregoing microprocessor CPU further generates the upper-and-lower six-phase cutoff command signal UDO or the upper three-phase cutoff first command signal UO and the lower three-phase cutoff first command signal DO, each of which responds to an excessive current abnormality, or generates the upper three-phase short-circuiting command signal US or the lower three-phase short-circuiting command signal DS, each of which responds to an excessive voltage abnormality; the foregoing upper three-phase short-circuiting command signal US or the foregoing upper three-phase cutoff first command signal UO that replaces the upper closing command signal Ux0 is inputted to the foregoing upper selection circuit 130u, so that all of the foregoing upstream switching devices 112u are closed or opened at once, through the intermediary of the foregoing penetration prevention circuit 140; the foregoing lower three-phase short-circuiting command signal DS or the foregoing lower three-phase cutoff first command signal DO that replaces the lower closing command signal Dx0 is inputted to the foregoing lower selection circuit 130d, so that all of the foregoing downstream switching device 112d are closed or opened at once, through the intermediary of the foregoing penetration prevention circuit 140.

In the case of the foregoing upper-and-lower six-phase cutoff command signal UDO, the occurrence of the excessive-current abnormality detection signal generated by the excessive current detection unit 203 is temporarily stored, and all of the foregoing upstream switching devices 112u and all of the foregoing downstream switching devices 112d are cut off; thus, after the excessive-current state is released, the foregoing temporary storage and the foregoing upper-and-lower six-phase cutoff command signal UDO are cancelled; the common selection circuit 210 is provided in the front stage portions of the foregoing upper selection circuit 130u and the foregoing lower selection circuit 130d; in the case of the foregoing upper three-phase short-circuiting command signal US, all of the foregoing upstream switching devices 112u are driven to close in response to the excessive voltage abnormality detection signal generated by the foregoing excessive voltage detection unit 201; the foregoing selection circuit 210 cuts off all of the foregoing downstream switching devices 112d so as to suppress the power-generation voltage of the three-phase AC motor 101; the foregoing lower three-phase short-circuiting command signal DS drives and closes all of the foregoing downstream switching devices 112d, in response to the excessive voltage abnormality detection signal generated by the foregoing excessive voltage detection unit 201; the foregoing selection circuit 210 cuts off all of the foregoing upstream switching devices 112u so as to suppress the power-generation voltage of the three-phase AC motor 101; in response to the device abnormality detection signal generated by the foregoing device abnormality detection unit 202, the foregoing microprocessor CPU selects the foregoing upper three-phase short-circuiting command signal US or the foregoing lower three-phase short-circuiting command signal DS; in the case where any one of the group of the foregoing upstream switching devices 112u and the group of the foregoing downstream switching devices 112d includes a disconnection abnormality switching device, the foregoing upper three-phase short-circuiting command signal US or the foregoing lower three-phase short-circuiting command signal DS is applied to the one thereof that does not include the disconnection abnormality switching device; in the case where any one of the group of the foregoing upstream switching devices 112u and the group of the foregoing downstream switching devices 112d includes a short-circuit abnormality switching device, the foregoing upper three-phase short-circuiting command signal US or the foregoing lower three-phase short-circuiting command signal DS is applied to the one thereof that includes the short-circuit abnormality switching device.

As described above, according to the invention recited in claim 2, any one of the upper three-phase short-circuiting command signal US and the lower three-phase short-circuiting command signal DS is generated by the microprocessor CPU, depending on whether the upstream switching device has a disconnection device abnormality or a short-circuit device abnormality or whether the downstream switching device has a disconnection device abnormality or a short-circuit device abnormality.

Accordingly, there is demonstrated a characteristic that even in the case where any one of the group of the upstream switching devices or the group of the downstream switching devices includes a disconnection abnormality device or a short-circuit abnormality device, the upper three-phase or lower three-phase short-circuiting command signal is made effective so as to suppress an excessive voltage from occurring so that the expansion of excessive-voltage device breakage in the low-voltage-system electric-power conversion unit can be prevented. Embodiment 2, described later, demonstrates the same characteristic.

The foregoing selection circuit 210 has the short-circuit command signal priority circuit 212 that gives priority to the foregoing excessive voltage abnormality, when it occurs, and enables the foregoing upper three-phase short-circuiting command signal US or the foregoing lower three-phase short-circuiting command signal DS, even in the time period in which due to the storage of the occurrence of the foregoing excessive current abnormality, the foregoing upper-and-lower six-phase cutoff command signal UDO is generated.

As described above, according to the invention recited in claim 3, there is provided a short-circuit command signal priority circuit that gives priority to the upper three-phase short-circuiting command signal or the lower three-phase short-circuiting command signal over the upper-and-lower six-phase cutoff command signal UDO.

Accordingly, in the case where due to the application of the upper-and-lower six-phase cutoff command signal UDO, an excessive voltage abnormality occurs, the temporary storage of an excessive-current abnormality state is released, and immediate application of the three-phase short-circuiting command signal is implemented so as to suppress an excessive voltage from occurring, so that excessive-voltage device breakage in the low-voltage-system electric-power conversion unit can be prevented. Embodiment 2 also demonstrates the same characteristic.

The foregoing device abnormality detection unit 202 determines whether or not there exists a short-circuit abnormality in which although the opening command signal is provided to each of the three pairs of the foregoing upstream switching device 112u and the foregoing downstream switching device 112d, any one thereof is closed and whether or not there exists a disconnection abnormality in which although the closing command signal is provided to each of the three pairs of the foregoing upstream switching device 112u and the foregoing downstream switching device 112d, any one thereof is opened; there are provided the upper device short-circuit detection storage circuit 205u that stores the foregoing short-circuit abnormality in any one of the foregoing upstream switching devices 112u, when it is detected, and then generates the lower three-phase cutoff second command signal DOO and the lower device short-circuit detection storage circuit 205d that stores the foregoing short-circuit abnormality in any one of the foregoing downstream switching devices 112d, when it is detected, and then generates the upper three-phase cutoff second command signal UOO; the middle-stage upper closing command signal Ux1, which is the output signal of the foregoing upper selection circuit 130u, responds to the occurrence of the foregoing upper three-phase cutoff second command signal UOO and hence the closing command signal is cancelled; the middle-stage lower closing command signal Dx1, which is the output signal of the foregoing lower selection circuit 130d, responds to the occurrence of the foregoing lower three-phase cutoff second command signal DOO and hence the closing command signal is cancelled.

As described above, according to the invention recited in claim 4, the upper device short-circuit detection storage circuit or the lower device short-circuit detection storage circuit that responds to the detection signal generated by the device abnormality detection unit generates the lower three-phase cutoff second command signal DOO or the upper three-phase cutoff second command signal UOO, so that the middle-stage upper closing command signal Ux1 or the lower closing command signal Dx1 is cancelled.

Therefore, there is demonstrated a characteristic that upper-and-lower short-circuit prevention processing can immediately be performed before the microprocessor performs cutoff processing for preventing upper-and-lower short-circuiting, in response to the abnormality detection signal ER from the abnormality monitoring unit. Embodiment 2 also demonstrates the same characteristic.

Before the foregoing microprocessor CPU stops its operation, short-circuit storage information pieces in the foregoing upper device short-circuit detection storage circuit 205u and the foregoing lower device short-circuit detection storage circuit 205d are read out and then are transmitted to and stored in the nonvolatile data memory DMEM; when the foregoing microprocessor CPU starts its operation, the short-circuit storage information pieces stored in the foregoing data memory DMEM are transmitted again to the foregoing upper device short-circuit detection storage circuit 205u and the foregoing lower device short-circuit detection storage circuit 205d.

As described above, according to the invention recited in claim 5, before the microprocessor stops its operation, short-circuit storage information pieces in the upper device short-circuit detection storage circuit and the lower device short-circuit detection storage circuit are transmitted to and stored in the nonvolatile data memory; when the microprocessor starts its operation, the short-circuit storage information pieces are restored and transmitted to the upper device short-circuit detection storage circuit and the lower device short-circuit detection storage circuit.

Accordingly, there is demonstrated a characteristic that switching control, of the switching devices, that reflects the past abnormality state is performed immediately after the start of driving so that concurrent closing of the upper and lower switching devices can be prevented from damaging the switching devices. Embodiment 2 also demonstrates the same characteristic.

The control power-source circuit 114 that supplies the stabilized control voltage Vcc to the foregoing calculation control unit 120A includes the step-down circuit 114a that is supplied with electric power by the foregoing vehicle battery 102, by way of the electric power switching device 103, and the stabilized power source circuit 114b connected in series with the step-down circuit 114a; the foregoing stabilized power source circuit 114b is connected with the externally connected auxiliary battery 12, by way of the power-source switching device 208 that includes a reverse flow prevention function; the foregoing power-source switching device 208 and the foregoing electric power switching device 103 are driven to close in response to the operation of the power-source switch 13 that is closed when driving of the vehicle is started; when the foregoing power-source switching device 208 or the foregoing electric power switching device 103 is closed and the foregoing stabilized power source circuit 114b generates the foregoing control voltage Vcc, the foregoing microprocessor CPU starts its control operation.

The foregoing microprocessor CPU is provided with the CPU operation detection circuit 209, which is typified by a watchdog timer, and the CPU operation detection circuit 209 generates the output permission signal OUTE while the foregoing microprocessor CPU normally operates; due to the effect of the foregoing output permission signal OUTE, the foregoing power-source switching device 208 is closed, and the closing state is self-held; when the foregoing power-source switch 13 and the foregoing electric power switching device 103 are opened and hence the foregoing three-phase AC motor 101 is generating electric power in a no-load rotation state, the foregoing microprocessor CPU further generates the foregoing upper three-phase short-circuiting command signal US or the foregoing lower three-phase short-circuiting command signal DS, regardless of whether or not the power-generation voltage, and when the rotation speed of the foregoing vehicle engine falls to a predetermined threshold-value rotation speed or lower, the microprocessor CPU autonomously stops and hence the generation of the foregoing output permission signal OUTE is stopped, so that the foregoing power-source switching device 208 is opened; the foregoing threshold-value rotation speed is a measured statistic value obtained from two or more samples, at which the power-generation voltage of the three-phase AC motor 101 becomes lower than DC 60 [V] under a no-load rotation state where the foregoing electric power switching device 103, the foregoing upstream switching device 112u, and the foregoing downstream switching device 112d are all opened.

As described above, according to the invention recited in claim 6, the microprocessor CPU performs its control operation, based on the control voltage Vcc generated by the stabilized power source circuit that operates with the vehicle battery for driving a motor and the auxiliary battery for performing control, as a power source; when the microprocessor is normally operating, the supply of electric power from the auxiliary battery is continuously self-held by the output permission signal; when both the power-source switch and the electric power switching device are opened and hence the three-phase AC motor is generating electric power in a no-load rotation state, the microprocessor generates the upper three-phase short-circuiting command signal or the lower three-phase short-circuiting command signal so as to suppress the power-generation voltage, and after the engine rotation speed is lowered, the microprocessor autonomously stops.

Accordingly, because while the three-phase short-circuiting command signal is generated during a no-load rotation period, the microprocessor can stably operate with the auxiliary battery, as a power source, regardless of the value of the power-generation voltage of the three-phase motor; thus, there is demonstrated a characteristic that the generation of the three-phase short-circuiting command signal can be sustained until the engine rotation speed is lowered enough to autonomously stop.

Embodiment 2

(1) Detailed Description of Configuration and Operation

Hereinafter, a motor control apparatus according to Embodiment 2 of the present invention will be explained in detail. A set of FIGS. 5A and 5B is a block diagram representing the overall circuit of a motor control apparatus according to Embodiment 2 of the present invention; FIG. 6 is a detailed block diagram representing part of the motor control apparatus according to Embodiment 2 of the present invention. In each of the drawings, the same reference characters denote the same or similar portions; the motor control apparatus 100A in foregoing Embodiment 1 is represented as a motor control apparatus 100B in Embodiment 2, and the capital English letter in the last position of each of the reference characters denote the distinction between the embodiments.

In FIGS. 5A and 5B, the main differences between FIGS. 5A and 5B and FIGS. 1A and 1B are only the fact that a post-stage selection circuit 150 represented in FIG. 6 is added between the penetration prevention circuit 140 and the electric-power conversion unit 110 in FIGS. 1A and 1B and the fact that the calculation control unit 120A in FIG. 1A is configured as a calculation control unit 120B in FIG. 5A. FIG. 6 represents the detailed configuration of the added post-stage selection circuit 150.

In FIG. 6, an upper selection circuit 153u included in the post-stage selection circuit 150 is an OR circuit device that generates the OR output G of an intermediary signal E and the inversed logic signal of the upper closing command signal Ux2 generated by the penetration prevention circuit 140, and a lower selection circuit 153d included in the post-stage selection circuit 150 is an OR circuit device that generates the OR output M of an intermediary signal F and the inversed logic signal of the lower closing command signal Dx2 generated by the penetration prevention circuit 140; a short-circuit prevention circuit 156 generates an intermediary signal Q, which is the AND output of the OR output G and the OR output M.

An upper distribution circuit 154u that generates the intermediary signal E is an AND circuit device, one input of which is the inversed logic signal of the output permission signal OUTE generated by the CPU operation detection circuit 209 and the other input of which is the output signal of a lower priority circuit 155 that generates the AND output of the inversed logic signal of the upper three-phase cutoff second command signal UOO generated by the lower device short-circuit detection storage circuit 205d and the logic signal of the lower three-phase cutoff second command signal DOO generated by the upper device short-circuit detection storage circuit 205u.

A lower distribution circuit 154d that generates the intermediary signal F is an AND circuit device, one input of which is the inversed logic signal of the output permission signal OUTE generated by the CPU operation detection circuit 209 and the other input of which is the inversed logic signal of the lower three-phase cutoff second command signal DOO generated by the upper device short-circuit detection storage circuit 205u.

An upper inversion coupling circuit 151u generates an OR output J of the inversed logic signal of the OR output G and the intermediary signal Q, and then generates a final-stage upper closing command signal Ux3 through the intermediary of an upper-side second penetration prevention timer 152u. A lower inversion coupling circuit 151d generates an OR output K of the inversed logic signal of the OR output M and the intermediary signal Q, and then generates a lower closing command signal Dx3 through the intermediary of a lower-side second penetration prevention timer 152d.

Each of the upper-side second penetration prevention timer 152u and the lower-side second penetration prevention timer 152d is a hardware timer, the output-signal logic level of which changes from H to L in a predetermined delay time Δt after the logic level of the input signal thereof changes from H to L and the output-signal logic level of which immediately changes from L to H when the logic level of the input signal thereof changes from L to H.

Each of the first-stage upper closing command signal Ux0 and the middle-stage upper closing command signal Ux1 is a positive logic signal, and when the logic level thereof is H, the upstream switching device 112u is driven to close by each thereof; in contrast, each of the post-stage upper closing command signal Ux2 and the final-stage upper closing command signal Ux3 is a negative logic signal, and when the logic level thereof is L, the upstream switching device 112u is driven to close by each thereof.

Similarly, each of the first-stage lower closing command signal Dx0 and the middle-stage lower closing command signal Dx1 is a positive logic signal, and when the logic level thereof is H, the downstream switching device 112d is driven to close by each thereof; in contrast, each of the post-stage lower closing command signal Dx2 and the final-stage lower closing command signal Dx3 is a negative logic signal, and when the logic level thereof is L, the downstream switching device 112d is driven to close by each thereof.

FIG. 7A is an explanatory table representing the logic list of former-half input and output signals of a post-stage selection circuit in the motor control apparatus according to Embodiment 2 of the present invention, and represents the logic changes of the signals in the former half of the post-stage selection circuit 150. FIG. 7B is an explanatory table representing the logic list of latter-half input and output signals of the post-stage selection circuit in the motor control apparatus according to Embodiment 2 of the present invention, and represents the logic changes of the signals in the latter half of the post-stage selection circuit 150.

In FIG. 7A, because when the logic level of the output permission signal OUTE is H, the logic levels of the intermediary signals E and F are determined as L, the relationship among the OR outputs G and M and the closing command signals are expressed by the equations below.

$$G=D\times2, M=D\times2$$

However, when the logic level of the output permission signal OUTE is L, the OR outputs G and M change in accordance with the logic levels of the intermediary signals E and F, respectively, and there is performed three-phase short-circuiting of the upper-arm devices or the lower-arm devices for which the upper three-phase cutoff second command signal UOO or the lower three-phase cutoff second command signal DOO is not generated. In this regard, however, when neither the upper three-phase cutoff second command signal UOO nor the lower three-phase cutoff second command signal DOO is not generated, the three-phase short-circuiting command signal is generated for the lower-arm device; when both the upper three-phase cutoff second command signal UOO and the lower three-phase cutoff second command signal DOO are generated, the three-phase short-circuiting command signals for the upper-arm and lower-arm devices are not generated.

In FIG. 7B, the OR outputs G and M and the OR outputs J and K, respectively, are mutually and logically inversed; as a result, the logic relationship between the post-stage upper closing command signal Ux2 and the post-stage lower closing command signal Dx2 and the logic relationship between the final-stage upper closing command signal Ux3 and the final-stage lower closing command signal Dx3 coincide with each other. When the logic level of the final-stage upper closing command signal Ux3 or the final-stage lower closing command signal Dx3 is L, the upstream switching device 112u or the downstream switching device 112d is driven to close by way of the upper gate circuit 113u or the lower gate circuit 113d.

It can freely be determined whether each of the logics of a series of the upper closing command signals Ux0, Ux1, Ux2, and Ux3 for the upstream switching device 112u is positive-logic or negative-logic. As is clear from the foregoing explanations for the series of the lower closing command signals Dx0, Dx1, Dx2, and Dx3 for the downstream switching device 112d, the logics thereof are selected in such a way that in the post-stage selection circuit 150 formed of hardware, the inversed logic signal of the output permission signal OUTE, which is a common three-phase short-circuiting command signal that provides an effect to the upstream switching device 112u or the downstream switching device 112d, is distributed to any one of the upstream switching device 112u and the downstream switching device 112d in accordance with the command-signal state of the upper three-phase cutoff second command signal UOO or the lower three-phase cutoff second command signal DOO and hence the upstream switching device 112u and the downstream switching device 112d are prevented from being driven to close concurrently.

In contrast, in the selection circuit 210 in foregoing FIG. 2, the microprocessor CPU generates the short-circuiting command signal after preliminarily making a distinction between the upper three-phase short-circuiting command signal US and the lower three-phase short-circuiting command signal DS; the three-phase short-circuiting command signals are command signals obtained by considering that the upstream switching device 112u and the downstream switching device 112d are prevented from being closed concurrently. However, it is also made possible that the microprocessor CPU generates a common three-phase short-circuiting command signal for the upstream switching device 112u and the downstream switching device 112d, and there is added a selection circuit that distributes the common three-phase short-circuiting command signal to the upstream switching device 112u or the downstream switching device 112d, in accordance with the command-signal state of the upper three-phase cutoff second command signal UOO or the lower three-phase cutoff second command signal DOO.

Next, based on FIGS. 4A and 4B, which are flowcharts of the first-half control operation and the second-half control operation, respectively, of the microprocessor, the operation of the motor control apparatus according to Embodiment 2 of the present invention will be explained. The flowcharts represented in FIGS. 4A and 4B are shared by the respective motor control apparatuses according to Embodiment 1, represented in foregoing FIGS. 1A and 1B, and Embodiment 2; as described above, Embodiment 2 is different from Embodiment 1 in FIGS. 1A and 1B, only with regard to the step 412d in FIG. 4A and the step 429 in FIG. 4B.

In the step 412d in FIG. 4A, because the output permission signal OUTE stops in the step 412c, the post-stage selection circuit 150 in FIG. 6 generates the three-phase short-circuiting command signal for the upstream switching device 112u or the downstream switching device 112d. As a result, in the case where although the microprocessor CPU has stopped, the electric power switching device 103 is closed or the three-phase AC motor 101 is generating electric power, the power-source voltage is supplied to the post-stage selection circuit 150 so that the three-phase short-circuiting is performed.

In this regard, however, in the case where when the electric power switching device 103 is opened, the three-phase short-circuiting performed lowers the power-generation voltage of the three-phase AC motor 101 and hence the gate voltage for performing the three-phase short-circuiting is reduced, the three-phase short-circuiting is automatically be cancelled. However, when due to the cancellation of the three-phase short-circuiting, the power-generation voltage of the three-phase AC motor 101 increases, the three-phase short-circuiting becomes effective again and hence an excessive voltage abnormality is prevented from occurring, even when the microprocessor CPU has been stopped. The same configuration is applied to the step 429 in FIG. 4B.

In each of the steps 412d and 429, there is explained for the three-phase short-circuiting at a time when the microprocessor CPU autonomously stops, while the power-source switch 13 is opened; however, the three-phase short-circuiting command signal generated by the post-stage selection circuit 150 is effective, even when the power-source switch 13 is closed or even when due to an abnormality in the microprocessor CPU itself, the CPU operation detection circuit 209 stops generation of the output permission signal OUTE.

(2) Gist and Feature of Embodiment 2

As is clear from the foregoing explanation, for the three-phase AC motor 101 having the permanent-magnet rotating magnetic poles integrally coupled with a vehicle engine and the three-phase armature winding for creating a rotating magnetic field, the motor control apparatus 100B according to Embodiment 2 of the present invention is provided with the electric-power conversion unit 110 that is supplied with electric power by the low-voltage-system vehicle battery 102 of a voltage under DC 60 [V], by way of the electric power switching device 103, the calculation control unit 120B for the electric-power conversion unit 110, and the abnormality monitoring unit 200; three pairs of upstream switching device 112u and the downstream switching device 112d, which are transistors, with each of which a commutation diode 112f is connected in parallel, and the power-source capacitor 111 are connected in parallel with the foregoing electric-power conversion unit 110; the foregoing calculation control unit 120B is provided with the microprocessor CPU that creates control signals for performing on/off control of the foregoing transistors so as to implement driving control of the foregoing three-phase AC motor 101 and charge control of the foregoing vehicle battery 102 and the nonvolatile program memory PMEM that collaborates with the microprocessor CPU; the foregoing abnormality monitoring unit 200 includes the excessive voltage detection unit 201 for the foregoing power-source capacitor 111, the device abnormality detection unit 202 that individually detects a disconnection abnormality or a short-circuit abnormality in each of the foregoing transistors, and the excessive current detection unit 203 for electric currents flowing in the foregoing armature windings of at least two phases among the three phases or an electric current flowing in each of the foregoing upstream switching device 112u and the foregoing downstream switching device 112d.

The foregoing microprocessor CPU generates the pulse-width modulation signal PWMx (x=U, V, or W) for each of the foregoing upstream switching devices 112u and the inversed PWM signal PWNx, which is the inverted logic signal of the foregoing pulse-width modulation signal PWMx, for each of the foregoing downstream switching devices 112d; the upstream switching devices 112u and the downstream switching devices 112d are connected with the respective armature windings of U, V, and W phase, which have 120° phase difference from one another, in the foregoing three-phase AC motor 101.

The foregoing microprocessor CPU further includes the upper-side penetration prevention means 122 and the lower-side penetration prevention means 124; the foregoing upper-side penetration prevention means 122 generates the upper closing command signal Ux0 in the delay time ΔT after the foregoing pulse-width modulation signal PWMx is generated; the foregoing upper closing command signal Ux0 drives to close the foregoing upstream switching device 112u by way of the upper selection circuit 130u and the penetration prevention circuit 140; the foregoing lower-side penetration prevention means 124 generates the lower closing command signal Dx0 in the delay time ΔT after the foregoing inversed PWM signal PWNx is generated; the foregoing lower closing command signal Dx0 drives to close the foregoing downstream switching device 112d by way of the lower selection circuit 130d and the foregoing penetration prevention circuit 140; the foregoing upper-side penetration prevention means 122 and the foregoing lower-side penetration prevention means 124 prohibit the respective closing command signals for the foregoing upstream switching device 112u and the foregoing downstream switching device 112d from being concurrently generated.

Each of the foregoing upper-side penetration prevention means 122 and the foregoing lower-side penetration prevention means 124 is configured by a software means, the processing of which is performed by the foregoing microprocessor CPU.

The foregoing penetration prevention circuit 140 includes the upper penetration prevention timer 142u and the lower penetration prevention timer 142d; the penetration prevention timers are hardware means that prohibit the respective closing command signals for the foregoing upstream switching device 112u and the foregoing downstream switching device 112d from being concurrently generated; in response to the abnormality detection signal ER inputted from the foregoing abnormality monitoring unit 200, the foregoing microprocessor CPU further generates the upper-and-lower six-phase cutoff command signal UDO or the upper three-phase cutoff first command signal UO and the lower three-phase cutoff first command signal DO, each of which responds to an excessive current abnormality, or generates the upper three-phase short-circuiting command signal US or the lower three-phase short-circuiting command signal DS, each of which responds to an excessive voltage abnormality; the foregoing upper three-phase short-circuiting command signal US or the foregoing upper three-phase cutoff first command signal UO that replaces the foregoing upper closing command signal Ux0 is inputted to the foregoing upper selection circuit 130u, so that all of the foregoing upstream switching devices 112u are closed or opened at once, through the intermediary of the foregoing penetration prevention circuit 140; the foregoing lower three-phase short-circuiting command signal DS or the foregoing lower three-phase cutoff first command signal DO that replaces the foregoing lower closing command signal Dx0 is inputted to the foregoing lower selection circuit 130d, so that all of the foregoing downstream switching devices 112d are closed or opened at once, through the intermediary of the foregoing penetration prevention circuit 140.

The control power-source circuit 114 that supplies the stabilized control voltage Vcc to the foregoing calculation control unit 120B includes the step-down circuit 114a that is supplied with electric power by the foregoing vehicle battery 102, by way of the foregoing electric power switching device 103, and the stabilized power source circuit 114b connected in series with the step-down circuit 114a; the foregoing stabilized power source circuit 114b is connected with the externally connected auxiliary battery 12, by way of the power-source switching device 208 that includes a reverse flow prevention function; the foregoing power-source switching device 208 and the foregoing electric power switching device 103 are driven to close in response to the operation of the power-source switch 13 that is closed when driving of the vehicle is started; in response to the fact that the foregoing power-source switching device 208 or the foregoing electric power switching device 103 is closed and the foregoing stabilized power source circuit 114b generates the foregoing control voltage Vcc, the foregoing microprocessor CPU starts its control operation.

The foregoing microprocessor CPU is provided with the CPU operation detection circuit 209, which is typified by a watchdog timer; the foregoing CPU operation detection circuit 209 generates the output permission signal OUTE while the foregoing microprocessor CPU normally operates; due to the effect of the foregoing output permission signal OUTE, the foregoing power-source switching device 208 is closed, and the closing state is self-held; when the foregoing power-source switch 13 and the foregoing electric power switching device 103 are opened and hence the foregoing three-phase AC motor 101 is generating electric power in a no-load rotation state, the foregoing microprocessor CPU further generates the foregoing upper three-phase short-circuiting command signal US or the foregoing lower three-phase short-circuiting command signal DS, regardless of the value of the power-generation voltage, and when the rotation speed of the foregoing vehicle engine falls to a predetermined threshold-value rotation speed or lower, the microprocessor CPU autonomously stops and hence the generation of the foregoing output permission signal OUTE is stopped, so that the foregoing power-source switching device 208 is opened; the foregoing threshold-value rotation speed is a measured statistic value obtained from two or more samples, at which the power-generation voltage of the foregoing three-phase AC motor 101 becomes lower than DC 60 [V] under a no-load rotation state where the foregoing electric power switching device 103, the foregoing upstream switching device 112u, and the foregoing downstream switching device 112d are all opened.

As described above, according to the invention recited in claim 6, the microprocessor CPU performs its control operation, based on the control voltage Vcc generated by the stabilized power source circuit that operates with the vehicle battery for driving a motor and the auxiliary battery for performing control, as a power source, and when the microprocessor is normally operating, the supply of electric power from the auxiliary battery is continuously self-held by the output permission signal; when both the power-source switch and the electric power switching device are opened and hence the three-phase AC motor is generating electric power in a no-load rotation state, the microprocessor generates the upper three-phase short-circuiting command signal or the lower three-phase short-circuiting command signal so as to suppress the power-generation voltage, and after the engine rotation speed is lowered, the microprocessor autonomously stops.

Accordingly, because while the three-phase short-circuiting command signal is generated during a no-load rotation period, the microprocessor can stably operate with the auxiliary battery, as a power source, regardless of the value of the power-generation voltage of the three-phase motor; thus, there is demonstrated a characteristic that the generation of the three-phase short-circuiting command signal can be sustained until the engine rotation speed is lowered enough to autonomously stop. This characteristic is the same as that of Embodiment 1.

The post-stage selection circuit 150 is provided at the post-stage position of the foregoing penetration prevention circuit 140; when the foregoing output permission signal OUTE is not generated, the foregoing post-stage selection circuit 150 generates the upper three-phase short-circuiting command signal E or the lower three-phase short-circuiting command signal F for all of the foregoing upstream switching devices 112u or the foregoing downstream switching devices 112d, as the case may be, so that when the foregoing microprocessor CPU is not operating, the generation voltage of the foregoing three-phase AC motor 101 is suppressed from becoming excessively high.

As described above, according to the invention recited in claim 7, when the output permission signal for detecting the operation state of the microprocessor is not functioning, the post-stage selection circuit generates the three-phase short-circuiting command signal.

Thus, there is demonstrated a characteristic that the power-generation voltage of the three-phase AC motor, which is generated by autonomous operation of the vehicle engine or descending-road inertial driving of the vehicle when during driving, the control operation of the microprocessor is stopped or while the operation of the microprocessor is stopped, is suppressed, so that excessive-voltage breakage of the circuit components is prevented from occurring.

In the case where the rotation speed of the three-phase AC motor decreases and hence the three-phase short-circuiting cannot be performed with the power-generation voltage thereof, the power-generation voltage in this state does not cause the excessive-voltage breakage of the circuit components, even when all of the upper and downstream switching devices are opened; however, when due to release of the three-phase short-circuiting, the power-generation voltage increases and hence the three-phase short-circuiting can be performed, the three-phase short-circuiting suppresses again the power-generation voltage.

Moreover, there is demonstrated a characteristic that while the microprocessor operates, the microprocessor generates the three-phase short-circuiting command signal or the six-phase cutoff command signal so as to reduce the load on the hardware and when the operation of the microprocessor is stopped, the hardware generates only a simple three-phase short-circuiting command signal, so that dual-system control can be performed.

The short-circuit abnormality detection signal, for the foregoing upstream switching device 112u or the foregoing downstream switching device 112d, that is detected by the foregoing device abnormality detection unit 202 is stored in the upper device short-circuit detection storage circuit 205u or the lower device short-circuit detection storage circuit 205d; when the foregoing upper device short-circuit detection storage circuit 205u or the foregoing lower device short-circuit detection storage circuit 205d has stored the short-circuit state of the foregoing upstream switching device 112u or the foregoing downstream switching device 112d, the foregoing post-stage selection circuit 150 generates the foregoing upper three-phase short-circuiting command signal E or the foregoing lower three-phase short-circuiting command signal F for the foregoing upstream switching device 112u or the foregoing downstream switching device 112d in which an short-circuit abnormality has occurred.

As described above, according to the invention recited in claim 8, when the upper device short-circuit detection storage circuit or the lower device short-circuit detection storage circuit has stored the short-circuit state of the upstream switching device or the downstream switching device, the post-stage selection circuit generates the upper three-phase short-circuiting command signal or the lower three-phase short-circuiting command signal for the foregoing upstream switching device or the downstream switching device in which an short-circuit abnormality has occurred.

Thus, there is demonstrated a characteristic that the occurrence of an excessive voltage abnormality can be prevented while an upper-and-lower short-circuit abnormality is prevented from occurring.

The foregoing post-stage selection circuit 150 includes the upper-side second penetration prevention timer 152u and the lower-side second penetration prevention timer 152d. The upper-side second penetration prevention timer 152u and the lower-side second penetration prevention timer 152d are hardware means that prohibit the respective closing command signals for the foregoing upstream switching device 112u and the foregoing downstream switching device 112d from being concurrently generated; in the case where the foregoing upper-side second penetration prevention timer 152u and the foregoing lower-side second penetration prevention timer 152d are provided, the foregoing upper penetration prevention timer 142u and the foregoing lower penetration prevention timer 142d provided in the foregoing penetration prevention circuit 140 are removed.

As described above, according to the invention recited in claim 9, the upper penetration prevention timer and the lower penetration prevention timer provided in the front-stage penetration prevention circuit are removed, and the upper-side second penetration prevention timer and the lower-side second penetration prevention timer are provided as replacements therefor in the post-stage selection circuit.

Thus, there is demonstrated a characteristic that at the positions immediately in the vicinity of the upper gate circuit and the lower gate circuit that drive the upstream switching device and the downstream switching device, respectively, erroneous operation caused by noise is prevented from concurrently closing the upstream switching device and the downstream switching device.

The present invention is not limited to the motor control apparatus according to any one of foregoing Embodiments 1 and 2; in the scope within the spirits of the present invention, the configurations of Embodiments 1 and 2 can appropriately be combined with each other, can partially be modified, or can partially be omitted.

What is claimed is:

1. A motor control apparatus for controlling a three-phase AC motor including permanent-magnet rotating magnetic poles integrally coupled with a vehicle engine mounted in a vehicle and a three-phase armature winding for generating a rotating magnetic field, the motor control apparatus comprising:
    an electric-power converter that is supplied with electric power by a vehicle battery mounted in the vehicle, by way of an electric power switching device, and that performs electric-power conversion between the vehicle battery and the three-phase AC motor;
    a calculation controller that controls the electric-power converter; and an abnormality monitor that monitors whether or not there exists an abnormality in the motor control apparatus, wherein the electric-power converter has a three-phase bridge circuit formed of an upstream switching device and a downstream switching device provided for each of three phases and a power-source capacitor connected in parallel with the three-phase bridge circuit, wherein the calculation controller is provided with a microprocessor that creates control signals for performing switching control of the upstream switching devices and the downstream switching devices so as to implement driving control of the three-phase AC motor and charge control of the vehicle battery and with a non-volatile program memory that collaborates with the microprocessor, wherein the abnormality monitor includes an excessive voltage detector that detects an excessive voltage abnormality against the voltage of the power-source capacitor or the vehicle battery, a device abnormality detector that detects a device abnormality in each of the upstream switching devices and the downstream switching devices, and an excessive current detector that detects an excessive current abnormality in electric currents flowing in the armature windings of at least two phases among the three phases and at least one of respective electric currents flowing in the upstream switching device and the downstream switching device, wherein the microprocessor generates a pulse-width modulation signal for the upstream switching device provided for each of the phases and an inversed pulse-width modulation signal, which is the inversed logic signal of the pulse-width modulation signal, for the downstream switching device provided for each of the phases, and includes an upper-side penetration preventer and a lower-side penetration preventer, wherein the upper-side penetration preventer generates an upper closing command signal in a predetermined delay time after the pulse-width modulation signal is generated, wherein the lower-side penetration preventer generates an lower closing command signal in a predetermined delay time after the inversed pulse-width modulation signal is generated, wherein based on the upper closing command signal supplied by way of an upper selection circuit and a penetration prevention circuit, the upstream switching device is driven to close, wherein based on the lower closing command signal supplied by way of a lower selection circuit and the penetration prevention circuit, the downstream switching device is driven to close, wherein the upper-side penetration preventer and the lower-side penetration preventer are software that prohibit the upper closing command signal and the lower closing command signal from being generated concurrently, wherein the penetration prevention circuit has an upper penetration prevention timer and a lower penetration prevention timer that function as hardware for prohibiting the upper closing command signal and the lower closing command signal from being generated concurrently, wherein the microprocessor generates any one of an upper-and-lower six-phase cutoff command signal for cutting off all of the upstream switching devices and the downstream switching devices in response to an excessive-current abnormality detection signal from the excessive current detector, an upper three-phase cutoff first command signal for cutting off only the upstream switching devices, and a lower three-phase cutoff first command signal for cutting off only the downstream switching devices, or the microprocessor generates any one of an upper three-phase short-circuiting command signal for short-circuiting only the upstream switching devices and a lower three-phase short-circuiting command signal for short-circuiting only the downstream switching devices, in response to an excessive voltage abnormality detection signal from the excessive voltage detector, wherein when instead of the upper closing command signal, the upper three-phase short-circuiting command signal is inputted thereto, the upper selection circuit closes at once all of the upstream switching devices provided for the respective phases, through the intermediary of the penetration prevention circuit, and when instead of the upper closing command signal, the upper three-phase cutoff first command signal is inputted thereto, the upper selection circuit opens at once all of the upstream switching devices provided for the respective phases, through the intermediary of the penetration prevention circuit, and wherein when instead of the lower closing command signal, the lower three-phase short-circuiting command signal is inputted thereto, the lower selection circuit closes at once all of the downstream switching devices provided for the respective phases, through the intermediary of the penetration prevention circuit, and when instead of the lower closing command signal, the lower three-phase cutoff first command signal is inputted thereto, the lower selection circuit opens at once all of the upstream switching devices provided for the respective phases, through the intermediary of the penetration prevention circuit.

2. The motor control apparatus according to claim 1, further including a selection circuit connected commonly with the respective front stage portions of the upper selection circuit and the lower selection circuit, wherein when generated, the upper-and-lower six-phase cutoff command signal is temporarily stored and is inputted to the selection circuit, wherein when the upper-and-lower six-phase cutoff command signal is inputted to the upper selection circuit, the upper selection circuit opens at once all of the upstream switching devices provided for the respective phases and holds the opening state until the excessive current abnormality is removed, and the lower selection circuit opens at once all of the downstream switching devices provided for the respective phases and holds the opening state until the excessive current abnormality is removed, wherein when the excessive current abnormality is removed, the temporary storage is cancelled and the upper-and-lower six-phase cutoff command signal is stopped from being inputted to the selection circuit, wherein when the upper three-phase short-circuiting command signal is generated, all of the upstream switching devices provided for the respective phases are closed at once, and the selection circuit drives and opens all of the downstream switching devices provided for the respective phases so as to suppress the power-generation voltage of the three-phase AC motor, wherein when the lower three-phase short-circuiting command signal is generated, all of the downstream switching devices provided for the respective phases are closed at once, and the selection circuit drives and opens all of the upstream switching devices provided for the respective phases so as to suppress the power-generation voltage of the three-phase AC motor,
wherein the microprocessor generates any one of the upper three-phase short-circuiting command signal for short-circuiting only the upstream switching devices and the lower three-phase short-circuiting command signal for short-circuiting only the downstream switching devices, in response to a device abnormality detection signal from the device abnormality detector,
wherein when any one of the upstream switching devices for the respective phases has a disconnection abnormality, the microprocessor generates the lower three-phase short-circuiting command signal, and when any one of the downstream switching devices for the respective phases has a disconnection abnormality, the microprocessor generates the upper three-phase short-circuiting command signal, and
wherein when any one of the upstream switching devices for the respective phases has a short-circuit abnormality, the microprocessor generates the upper three-phase short-circuiting command signal, and when any one of the downstream switching devices for the respective phases has a short-circuit abnormality, the microprocessor generates the lower three-phase short-circuiting command signal.

3. The motor control apparatus according to claim 2, wherein the selection circuit has a short-circuit command signal priority circuit for preferentially inputting the upper three-phase short-circuiting command signal to the upper selection circuit or preferentially inputting the lower three-phase short-circuiting command signal to the lower selection circuit, when even in a period in which the upper-and-lower six-phase cutoff command signal is temporarily stored and inputted, the excessive voltage abnormality occurs.

4. The motor control apparatus according to claim 3, further including an upper device short-circuit detection storage circuit that stores a device abnormality caused by short-circuiting, when the device abnormality caused by short-circuiting is detected in the upstream switching device, and generates a lower three-phase cutoff second command signal for the downstream switching device and a lower device short-circuit detection storage circuit that stores a device abnormality caused by short-circuiting, when the device abnormality caused by short-circuiting is detected in the downstream switching device, and generates an upper three-phase cutoff second command signal for the upstream switching device,
wherein the upper closing command signal, which is the output signal of the upper selection circuit, is cancelled in response to generation of the upper three-phase cutoff second command signal, and
wherein the lower closing command signal, which is the output signal of the lower selection circuit, is cancelled in response to generation of the lower three-phase cutoff second command signal.

5. The motor control apparatus according to claim 4, wherein short-circuit storage information stored in each of the upper device short-circuit detection storage circuit and the lower device short-circuit detection storage circuit is read before the microprocessor stops its control operation and is transmitted to and stored in a nonvolatile data memory, and
wherein when the microprocessor starts its control operation, the short-circuit storage information that has been transmitted to and stored in the data memory is transmitted again to each of the upper device short-circuit detection storage circuit and the lower device short-circuit detection storage circuit.

6. The motor control apparatus according to claim 3, further including a control power-source circuit that supplies a control voltage to the calculation control unit and a microprocessor operation detection circuit that detects operation of the microprocessor and generates an output permission signal while the microprocessor normally operates,
wherein the control power-source circuit includes a step-down circuit that is supplied with electric power by the vehicle battery, by way of the electric power switching device, and a stabilized power source circuit that is connected in series with the step-down circuit,
wherein the stabilized power source circuit is connected with an externally connected auxiliary battery, by way of a power-source switching device that includes a reverse flow prevention function,
wherein the power-source switching device and the electric power switching device are driven to close, in response to the operation of a power-source switch that is closed when driving of the vehicle is started,
wherein in response to the fact that the power-source switching device or the electric power switching device is closed and the stabilized power source circuit generates the control voltage, the microprocessor starts its control operation,
wherein based on the output permission signal generated by the microprocessor operation detection circuit, the power-source switching device is closed, and the closing state thereof is self-held,
when the power-source switch and the electric power switching device are opened and hence the three-phase AC motor is generating electric power in a no-load rotation state, the microprocessor further generates the upper three-phase short-circuiting command signal or the lower three-phase short-circuiting command signal, regardless of the value of the power-generation voltage, and after the rotation speed of the vehicle engine falls to a predetermined threshold-value rotation speed or lower, the microprocessor autonomously stops,
wherein the microprocessor operation detection circuit detects the fact that the microprocessor has autonomously stopped, and stops the generation of the output permission signal,
wherein because the microprocessor operation detection circuit stops the generation of the output permission signal, the power-source switching device is closed, and
wherein the threshold-value rotation speed is a measured statistic value obtained from two or more samples, at which the power-generation voltage of the three-phase AC motor becomes lower than a predetermined voltage, in the no-load rotation state where the electric power switching device, the upstream switching device, and the downstream switching device are all opened.

7. The motor control apparatus according to claim 6, wherein a post-stage selection circuit is provided at the post-stage position of the penetration prevention circuit, and
wherein when the output permission signal is not generated, the post-stage selection circuit generates the upper three-phase short-circuiting command signal for all of the upstream switching devices or the lower three-phase short-circuiting command signal for all of the downstream switching devices, so that when the microprocessor is not operating, the generation voltage of the three-phase AC motor is suppressed from becoming excessively high.

8. The motor control apparatus according to claim 2, further including an upper device short-circuit detection storage circuit that stores a device abnormality caused by short-circuiting, when the device abnormality caused by short-circuiting is detected in the upstream switching device, and generates a lower three-phase cutoff second command signal for the downstream switching device and a lower device short-circuit detection storage circuit that stores a device abnormality caused by short-circuiting, when the device abnormality caused by short-circuiting is detected in the downstream switching device, and generates an upper three-phase cutoff second command signal for the upstream switching device,
wherein the upper closing command signal, which is the output signal of the upper selection circuit, is cancelled in response to generation of the upper three-phase cutoff second command signal, and
wherein the lower closing command signal, which is the output signal of the lower selection circuit, is cancelled in response to generation of the lower three-phase cutoff second command signal.

9. The motor control apparatus according to claim 8,
wherein short-circuit storage information stored in each of the upper device short-circuit detection storage circuit and the lower device short-circuit detection storage circuit is read before the microprocessor stops its control operation and is transmitted to and stored in a nonvolatile data memory, and
wherein when the microprocessor starts its control operation, the short-circuit storage information that has been transmitted to and stored in the data memory is transmitted again to each of the upper device short-circuit detection storage circuit and the lower device short-circuit detection storage circuit.

10. The motor control apparatus according to claim 2, further including a control power-source circuit that supplies a control voltage to the calculation control unit and a microprocessor operation detection circuit that detects operation of the microprocessor and generates an output permission signal while the microprocessor normally operates,
wherein the control power-source circuit includes a step-down circuit that is supplied with electric power by the vehicle battery, by way of the electric power switching device, and a stabilized power source circuit that is connected in series with the step-down circuit,
wherein the stabilized power source circuit is connected with an externally connected auxiliary battery, by way of a power-source switching device that includes a reverse flow prevention function,
wherein the power-source switching device and the electric power switching device are driven to close, in response to the operation of a power-source switch that is closed when driving of the vehicle is started,
wherein in response to the fact that the power-source switching device or the electric power switching device is closed and the stabilized power source circuit generates the control voltage, the microprocessor starts its control operation,
wherein based on the output permission signal generated by the microprocessor operation detection circuit, the power-source switching device is closed, and the closing state thereof is self-held,
when the power-source switch and the electric power switching device are opened and hence the three-phase AC motor is generating electric power in a no-load rotation state, the microprocessor further generates the upper three-phase short-circuiting command signal or the lower three-phase short-circuiting command signal, regardless of the value of the power-generation voltage, and after the rotation speed of the vehicle engine falls to a predetermined threshold-value rotation speed or lower, the microprocessor autonomously stops,
wherein the microprocessor operation detection circuit detects the fact that the microprocessor has autonomously stopped, and stops the generation of the output permission signal,
wherein because the microprocessor operation detection circuit stops the generation of the output permission signal, the power-source switching device is closed, and
wherein the threshold-value rotation speed is a measured statistic value obtained from two or more samples, at which the power-generation voltage of the three-phase AC motor becomes lower than a predetermined voltage, in the no-load rotation state where the electric power switching device, the upstream switching device, and the downstream switching device are all opened.

11. The motor control apparatus according to claim 10,
wherein a post-stage selection circuit is provided at the post-stage position of the penetration prevention circuit, and
wherein when the output permission signal is not generated, the post-stage selection circuit generates the upper three-phase short-circuiting command signal for all of the upstream switching devices or the lower three-phase short-circuiting command signal for all of the downstream switching devices, so that when the microprocessor is not operating, the generation voltage of the three-phase AC motor is suppressed from becoming excessively high.

12. The motor control apparatus according to claim 11, further including an upper device short-circuit detection storage circuit for storing a short-circuit abnormality detection signal, for the upstream switching device, that is detected by the device abnormality detection unit and a lower device short-circuit detection storage circuit for storing a short-circuit abnormality detection signal, for the downstream switching device, that is detected by the device abnormality detector,
wherein when the upper device short-circuit detection storage circuit has stored the short-circuit state of the upstream switching device, the post-stage selection circuit generates the upper three-phase short-circuiting command signal, and
wherein when the lower device short-circuit detection storage circuit has stored the short-circuit state of the downstream switching device, the post-stage selection circuit generates the lower three-phase short-circuiting command signal.

13. The motor control apparatus according to claim 1, further including an upper device short-circuit detection storage circuit that stores a device abnormality caused by short-circuiting, when the device abnormality caused by short-circuiting is detected in the upstream switching device, and generates a lower three-phase cutoff second command signal for the downstream switching device and a lower device short-circuit detection storage circuit that stores a device abnormality caused by short-circuiting, when the device abnormality caused by short-circuiting is detected in the downstream switching device, and generates an upper three-phase cutoff second command signal for the upstream switching device, wherein the upper closing command signal, which is the output signal of the upper selection circuit, is cancelled in response to generation of the upper three-phase cutoff second command signal, and wherein the lower closing command signal, which is the output signal of the lower selection circuit, is cancelled in response to generation of the lower three-phase cutoff second command signal.

14. The motor control apparatus according to claim 13, wherein short-circuit storage information stored in each of the upper device short-circuit detection storage circuit and the lower device short-circuit detection storage circuit is read before the microprocessor stops its control operation and is transmitted to and stored in a nonvolatile data memory, and wherein when the microprocessor starts its control operation, the short-circuit storage information that has been transmitted to and stored in the data memory is transmitted again to each of the upper device short-circuit detection storage circuit and the lower device short-circuit detection storage circuit.

15. The motor control apparatus according to claim 1, further including a control power-source circuit that supplies a control voltage to the calculation control unit and a microprocessor operation detection circuit that detects operation of the microprocessor and generates an output permission signal while the microprocessor normally operates, wherein the control power-source circuit includes a step-down circuit that is supplied with electric power by the vehicle battery, by way of the electric power switching device, and a stabilized power source circuit that is connected in series with the step-down circuit, wherein the stabilized power source circuit is connected with an externally connected auxiliary battery, by way of a power-source switching device that includes a reverse flow prevention function, wherein the power-source switching device and the electric power switching device are driven to close, in response to the operation of a power-source switch that is closed when driving of the vehicle is started, wherein in response to the fact that the power-source switching device or the electric power switching device is closed and the stabilized power source circuit generates the control voltage, the microprocessor starts its control operation, wherein based on the output permission signal generated by the microprocessor operation detection circuit, the power-source switching device is closed, and the closing state thereof is self-held, when the power-source switch and the electric power switching device are opened and hence the three-phase AC motor is generating electric power in a no-load rotation state, the microprocessor further generates the upper three-phase short-circuiting command signal or the lower three-phase short-circuiting command signal, regardless of the value of the power-generation voltage, and after the rotation speed of the vehicle engine falls to a predetermined threshold-value rotation speed or lower, the microprocessor autonomously stops, wherein the microprocessor operation detection circuit detects the fact that the microprocessor has autonomously stopped, and stops the generation of the output permission signal, wherein because the microprocessor operation detection circuit stops the generation of the output permission signal, the power-source switching device is closed, and wherein the threshold-value rotation speed is a measured statistic value obtained from two or more samples, at which the power-generation voltage of the three-phase AC motor becomes lower than a predetermined voltage, in the no-load rotation state where the electric power switching device, the upstream switching device, and the downstream switching device are all opened.

16. The motor control apparatus according to claim 15, wherein a post-stage selection circuit is provided at the post-stage position of the penetration prevention circuit, and wherein when the output permission signal is not generated, the post-stage selection circuit generates the upper three-phase short-circuiting command signal for all of the upstream switching devices or the lower three-phase short-circuiting command signal for all of the downstream switching devices, so that when the microprocessor is not operating, the generation voltage of the three-phase AC motor is suppressed from becoming excessively high.

17. The motor control apparatus according to claim 16, further including an upper device short-circuit detection storage circuit for storing a short-circuit abnormality detection signal, for the upstream switching device, that is detected by the device abnormality detection unit and a lower device short-circuit detection storage circuit for storing a short-circuit abnormality detection signal, for the downstream switching device, that is detected by the device abnormality detector, wherein when the upper device short-circuit detection storage circuit has stored the short-circuit state of the upstream switching device, the post-stage selection circuit generates the upper three-phase short-circuiting command signal, and wherein when the lower device short-circuit detection storage circuit has stored the short-circuit state of the downstream switching device, the post-stage selection circuit generates the lower three-phase short-circuiting command signal.

18. The motor control apparatus according to claim 17, wherein the post-stage selection circuit is provided at the post-stage position of the penetration prevention circuit, wherein the post-stage selection circuit has an upper-side second penetration prevention timer and a lower-side second penetration prevention timer that function as hardware for prohibiting the upper closing command signal and the lower closing command signal from being generated concurrently, and wherein in the case where the upper-side second penetration prevention timer and the lower-side second penetration prevention timer are provided, the upper penetration prevention timer and the lower penetration prevention timer provided in the penetration prevention circuit are removed.

19. The motor control apparatus according to claim 16,
wherein the post-stage selection circuit is provided at the post-stage position of the penetration prevention circuit,
wherein the post-stage selection circuit has an upper-side second penetration prevention timer and a lower-side second penetration prevention timer that function as hardware for prohibiting the upper closing command signal and the lower closing command signal from being generated concurrently, and
wherein in the case where the upper-side second penetration prevention timer and the lower-side second penetration prevention timer are provided, the upper penetration prevention timer and the lower penetration prevention timer provided in the penetration prevention circuit are removed.

20. The motor control apparatus according to claim 15,
wherein the post-stage selection circuit is provided at the post-stage position of the penetration prevention circuit,
wherein the post-stage selection circuit has an upper-side second penetration prevention timer and a lower-side second penetration prevention timer that function as hardware for prohibiting the upper closing command signal and the lower closing command signal from being generated concurrently, and
wherein in the case where the upper-side second penetration prevention timer and the lower-side second penetration prevention timer are provided, the upper penetration prevention timer and the lower penetration prevention timer provided in the penetration prevention circuit are removed.

* * * * *